(12) United States Patent
Fukao et al.

(10) Patent No.: US 10,597,109 B2
(45) Date of Patent: Mar. 24, 2020

(54) BICYCLE COMPONENT POSITIONING DEVICE

(71) Applicant: Shimano Inc., Sakai, Osaka (JP)

(72) Inventors: Kazutaka Fukao, Osaka (JP); Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 439 days.

(21) Appl. No.: 14/165,794

(22) Filed: Jan. 28, 2014

(65) Prior Publication Data

US 2015/0210342 A1 Jul. 30, 2015

(51) Int. Cl.
*B62K 23/06* (2006.01)
*B62M 25/04* (2006.01)

(52) U.S. Cl.
CPC ............. *B62K 23/06* (2013.01); *B62M 25/04* (2013.01); *Y10T 74/20396* (2015.01)

(58) Field of Classification Search
CPC ........ B62K 23/02; B62K 23/06; B62M 25/02; B62M 25/04; B62M 25/045; Y10T 74/20438
See application file for complete search history.

(56) References Cited

U.S. PATENT DOCUMENTS

| | | | | |
|---|---|---|---|---|
| 7,437,969 B2* | 10/2008 | Ose | ......................... | B62M 25/04 74/501.6 |
| 7,665,382 B2* | 2/2010 | Kawakami | ............. | B62K 23/06 74/473.14 |
| 2007/0017316 A1* | 1/2007 | Tsumiyama | ........... | B62K 23/06 74/502.2 |
| 2007/0068312 A1* | 3/2007 | Sato | ....................... | B62K 23/06 74/502.2 |
| 2008/0202277 A1* | 8/2008 | Miki | ...................... | B62K 23/06 74/502.2 |
| 2008/0257098 A1* | 10/2008 | Kawakami | ............. | B62K 23/06 74/502.2 |
| 2008/0264197 A1* | 10/2008 | Shahana | .................. | B62M 9/12 74/502.2 |

(Continued)

FOREIGN PATENT DOCUMENTS

JP        2013-86 A       1/2013

*Primary Examiner* — Richard W Ridley
*Assistant Examiner* — Brian J McGovern
(74) *Attorney, Agent, or Firm* — Global IP Counselors, LLP

(57) ABSTRACT

A bicycle component positioning device includes a wire takeup member, a positioning member, first and second maintaining members and a release member. The positioning member rotates with the wire takeup member between a plurality of predetermined positions. The first maintaining member moves between a position to maintain the positioning member in one of the predetermined positions and a position to release the positioning member. The second maintaining member moves between a position to maintain the positioning member in one of the predetermined positions and a position to release the positioning member. The release member moves in the first direction to selectively move the first maintaining member between its two positions, and to selectively move the second maintaining member between its two positions. The release member moves in the second direction in response to a rotation of the wire takeup member in the second direction.

15 Claims, 18 Drawing Sheets

(56) References Cited

U.S. PATENT DOCUMENTS

2011/0079103 A1* 4/2011 Kususe .................. B60T 7/102
                                                    74/502.2
2013/0081507 A1* 4/2013 Fukao ................... B62M 25/04
                                                    74/502.2

* cited by examiner

BICYCLE COMPONENT POSITIONING DEVICE

BACKGROUND

Field of the Invention

This invention generally relates to a bicycle component positioning device. More specifically, the present invention relates to a bicycle component positioning device for changing an operating position of a bicycle component such as a derailleur or an internally geared hub.

Background Information

Bicycles are often provided with one or more bicycle component positioning devices for changing operating positions of bicycle components, such as derailleurs, internally geared hubs, or suspensions of a bicycle. Some bicycles are provided with a drive train having multiple gears that allows the rider to select a particular gear for a particular situation. A bicycle component positioning device is usually provided for the rider to manually change gears of the drive train. This type of bicycle component positioning device is often called a bicycle shifter. In most cases, the bicycle component positioning device is mounted to a part of a handlebar or a frame of the bicycle. Multi-speed bicycle transmissions typically includes a chain, one or more front sprockets or gears mounted to a front crankset and a plurality of rear sprockets or gears mounted to a rear hub of a rear wheel. Thus, two bicycle component positioning devices (e.g., the shifters) are often used to operate a pair of gear changing devices (e.g., derailleurs or internally geared hubs) to select a desired gear ratio.

SUMMARY

Generally, the present disclosure is directed to various features of a bicycle component positioning device. In one feature, a bicycle component positioning device is provided in which reliable changing an operating position of a bicycle component can be attained.

In view of the state of the known technology and in accordance with a first aspect of the present disclosure, a bicycle component positioning device is provided that basically comprises a wire takeup member, a positioning member, a first maintaining member, a second maintaining member and a release member. The wire takeup member is arranged to rotate about a rotational axis in a first direction and a second direction that is opposite to the first direction. The positioning member is configured to rotate with the wire takeup member between a plurality of predetermined positions. The first maintaining member is configured to move between a first maintaining position to maintain the positioning member in one of the predetermined positions and a first releasing position to release the positioning member. The second maintaining member is configured to move between a second maintaining position to maintain the positioning member in one of the predetermined positions and a second releasing position to release the positioning member. The release member is configured to move in the first direction so as to selectively move the first maintaining member between the first maintaining position and the first releasing position, and to selectively move the second maintaining member between the second maintaining position and the second releasing position. The release member is configured to move in the second direction in response to a rotation of the wire takeup member in the second direction.

In accordance with a second aspect of the present invention, the bicycle component positioning device according to the first aspect is configured so that the positioning member includes positioning teeth, the first maintaining member includes a first pawl that selectively engages one of the positioning teeth, and the second maintaining member includes a second pawl that selectively engages one of the positioning teeth.

In accordance with a third aspect of the present invention, the bicycle component positioning device according to the second aspect is configured so that the first pawl is biased towards the first maintaining position, and the second pawl is biased towards the second maintaining position.

In accordance with a fourth aspect of the present invention, the bicycle component positioning device according to the third aspect is configured so that the release member alternatively moves the first pawl towards the first releasing position and the second pawl towards the second releasing position as the release member moves in the first direction.

In accordance with a fifth aspect of the present invention, the bicycle component positioning device according to the first aspect is configured so that the release member is movably coupled to the positioning member to move in the first direction within a prescribed range relative to the positioning member between a non-release position and a release position.

In accordance with a sixth aspect of the present invention, the bicycle component positioning device according to the fifth aspect is configured so that the release member alternatively holds one of the first and second maintaining members out of engagement with the positioning teeth of the positioning member while the release member is in the release position.

In accordance with a seventh aspect of the present invention, the bicycle component positioning device according to the fifth aspect further comprises a biasing member disposed between the release member and the positioning member and biasing the release member to the non-release position.

In accordance with an eighth aspect of the present invention, the bicycle component positioning device according to the seventh aspect further comprises a first operating member movably arranged to move the release member in the first direction from the non-release position towards the release position as the first operating member moves from a first rest position to a first actuated position.

In accordance with a ninth aspect of the present invention, the bicycle component positioning device according to the eighth aspect further comprises a second operating member movably arranged to rotate the positioning member and the wire takeup member in the second direction as the second operating member moves from a second rest position to a second actuated position.

In accordance with a tenth aspect of the present invention, the bicycle component positioning device according to the ninth aspect is configured so that the first and second operating members are configured as trigger levers that are biased towards the first and second rest positions, respectively.

In accordance with an eleventh aspect of the present invention, the bicycle component positioning device according to the ninth aspect is configured so that the first operating member is pivotally mounted on an axis that is offset from the rotational axis of the wire takeup member, and the second operating member is pivotally mounted on an axis that is coaxial with the rotational axis of the wire takeup member.

In accordance with a twelfth aspect of the present invention, the bicycle component positioning device according to the ninth aspect further comprises a release pawl operatively coupled to the first operating member. The release member includes release teeth that are engaged by the release pawl to move the release member in the first direction as the first operating member moves from the first rest position to the first actuated position.

In accordance with a thirteenth aspect of the present invention, the bicycle component positioning device according to the twelfth aspect is configured so that the release pawl is biased on as to engage with the release teeth, and is held disengaged from the release teeth while the first operating member is in the first rest position.

In accordance with a fourteenth aspect of the present invention, the bicycle component positioning device according to the ninth aspect is configured so that the positioning member includes pulling teeth, and the second operating member is operatively coupled to a pulling pawl that engages the putting teeth and rotates the positioning member and the wire takeup member in the second direction as the second operating member moves from the second rest position to the second actuated position.

In accordance with a fifteenth aspect of the present invention, the bicycle component positioning device according to the fourteenth aspect is configured so that the pulling pawl is biased so as to engage the pulling teeth while the first and second operating member are in the first and second rest positions, respectively.

In accordance with a sixteenth aspect of the present invention, the bicycle component positioning device according to the fifteenth aspect is configured so that the pulling pawl is disengaged from the pulling teeth as the first operating member moves from the first rest position toward the first actuated position.

In accordance with a seventeenth aspect of the present invention, the bicycle component positioning device according to the sixteenth aspect is configured so that the release member includes abutments that move the pulling pawl out of engagement with the pulling teeth as the release member moves in the first direction by movement of the first operating member from the first rest position to the first actuated position.

Also other objects, features, aspects and advantages of the disclosed bicycle component positioning device wilt become apparent to those skilled in the art from the following detailed description, which, taken in conjunction with the annexed drawings, discloses one embodiment of the bicycle component positioning device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
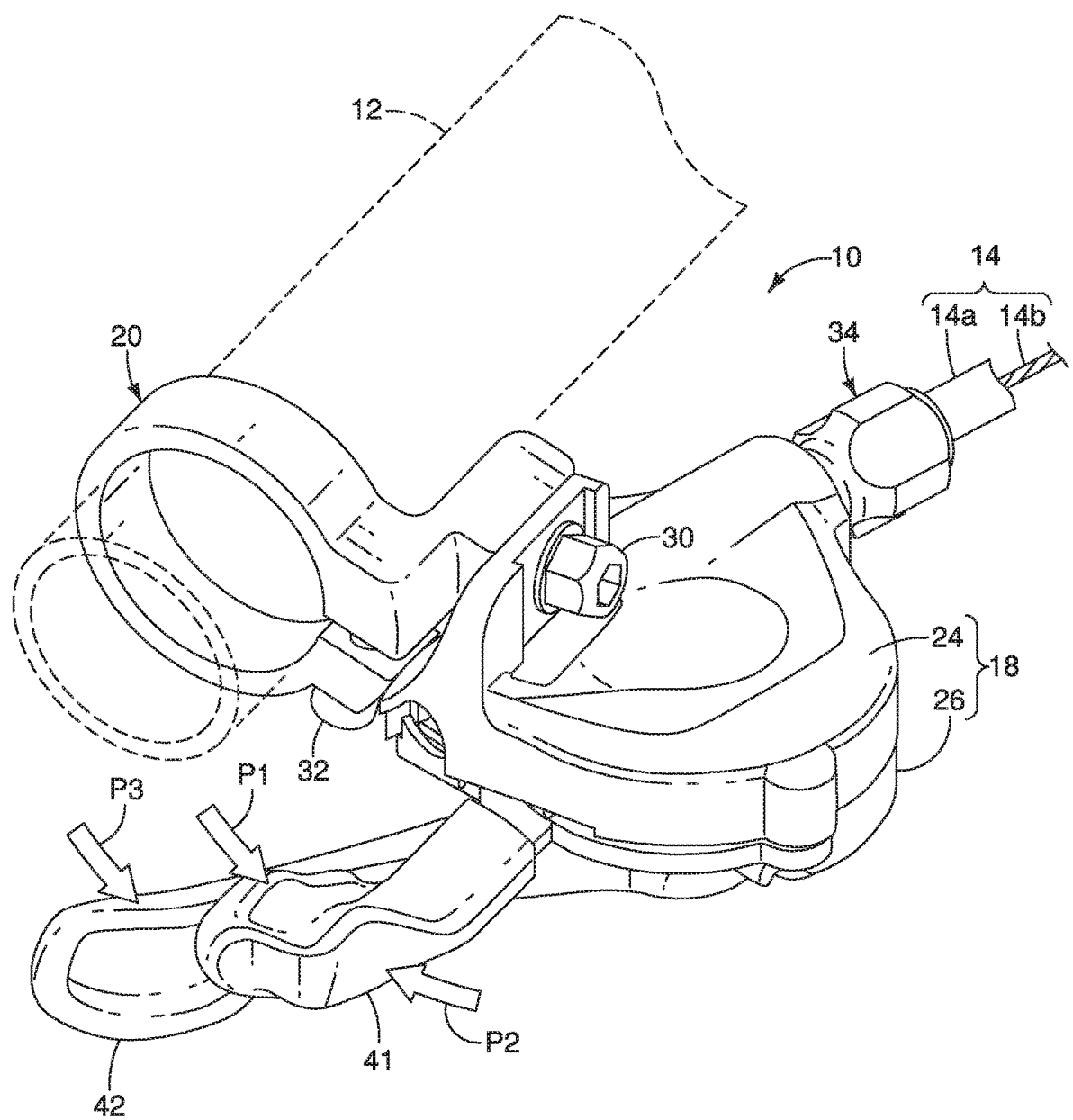
FIG. 1 is a perspective view of a bicycle component positioning device in accordance with one illustrated embodiment.

Referring initially to FIG. 1, a bicycle component positioning device 10 is illustrated in accordance with one illustrated embodiment. Here, the bicycle component positioning device 10 is configured to be mounted to a right side of a handlebar 12 so as to be operated by rider's right hand. In the first illustrated embodiment, the bicycle component positioning device 10 is configured to be operatively coupled to one of a bicycle component (not shown) via a control cable 14. More specifically, the bicycle component positioning device 10 is configured as a shifter for controlling the gear positions of a rear gear changing device such as a derailleur or an internally geared hub. However, the bicycle component positioning device 10 can be configured as a bicycle control device for operating other types of bicycle components (e.g., suspension devices) as needed and/or desired.

Also, the bicycle component positioning device 10 can be modified to be mounted on the left side of a handlebar 12. Thus, two bicycle component positioning devices could be provided on opposite ends of the handlebar 12. In such a case, the one of the bicycle component positioning devices would be used to operate a first bicycle component and the other of the bicycle component positioning devices would be used to operate a second bicycle component. When the bicycle component positioning devices are configured as gear shifters, the two bicycle component positioning devices could be essentially identical in operation, except that they would be mirror images of each other, and they may have a different number of actuation (shift) positions.

Preferably, as seen in FIG. 1, the control cable 14 is a conventional bicycle operating cable that has an outer case 14a covering an inner wire 14b. In other words, the control cable 14 is a Bowden type cable in which the inner wire 14b is slidably received within the outer case 14a. The bicycle component positioning device 10 operates the bicycle component (not shown) by selectively pulling and releasing the inner wire 14b.

Figure 2:
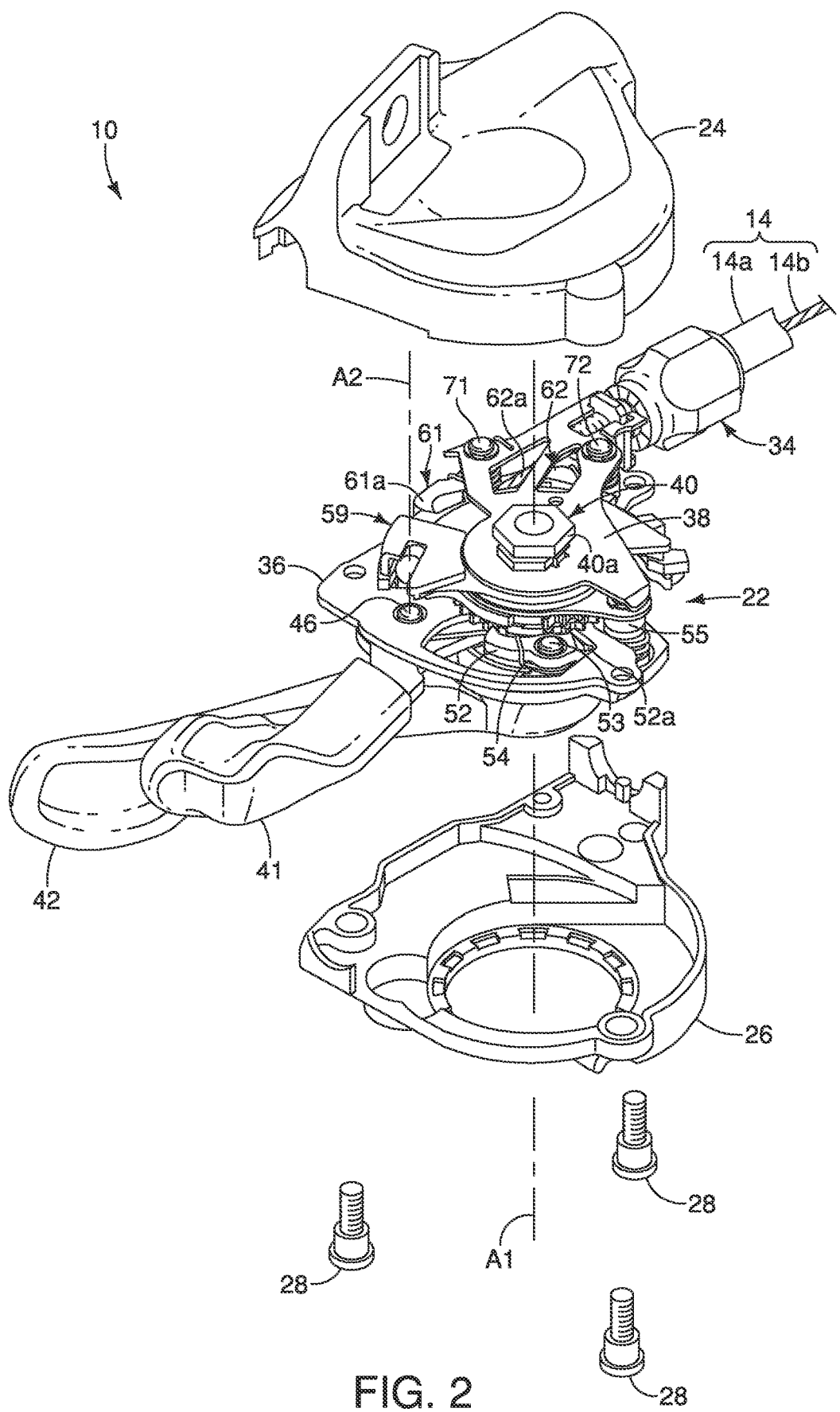
FIG. 2 is a perspective view of the bicycle component positioning device illustrated in FIG. 1 with the handlebar clamp removed and upper and lower housing parts exploded from a main operating unit.

As seen in FIG. 1, the bicycle component positioning device 10 includes a housing 18 and a handlebar clamp 20. The housing 18 covers a cable position maintaining mechanism 22 (hereinafter, "the maintaining mechanism 22" simply) of the bicycle component positioning device 10. Here, the housing 18 has a two-piece construction that is fastened together. In particular, as seen in FIGS. 1 and 2, the housing 18 includes a first or upper housing part 24 and a second or lower housing part 26. The upper and lower housing parts 24 and 26 are hard rigid members constructed of a suitable material such as a hard plastic or a lightweight metal. The upper and lower housing parts 24 and 26 are fastened together by three screws 28. However, the housing 18 can have a variety of configurations as needed and/or desired. As seen in FIG. 1, the handlebar clamp 20 is coupled to the upper housing part 24 by a fastener 30 (i.e., a nut and bolt in the illustrated embodiment). The handlebar clamp 20 is a conventional tube clamp that constitutes an example of a handlebar mounting member. Here, the handlebar clamp 20 includes a tightening bolt 32 or other tightening member that is configured to squeeze the handlebar clamp 20 onto the handlebar 12. Preferably, a cable adjuster 34 is provided on the maintaining mechanism 22 in a conventional manner.

Figure 3:
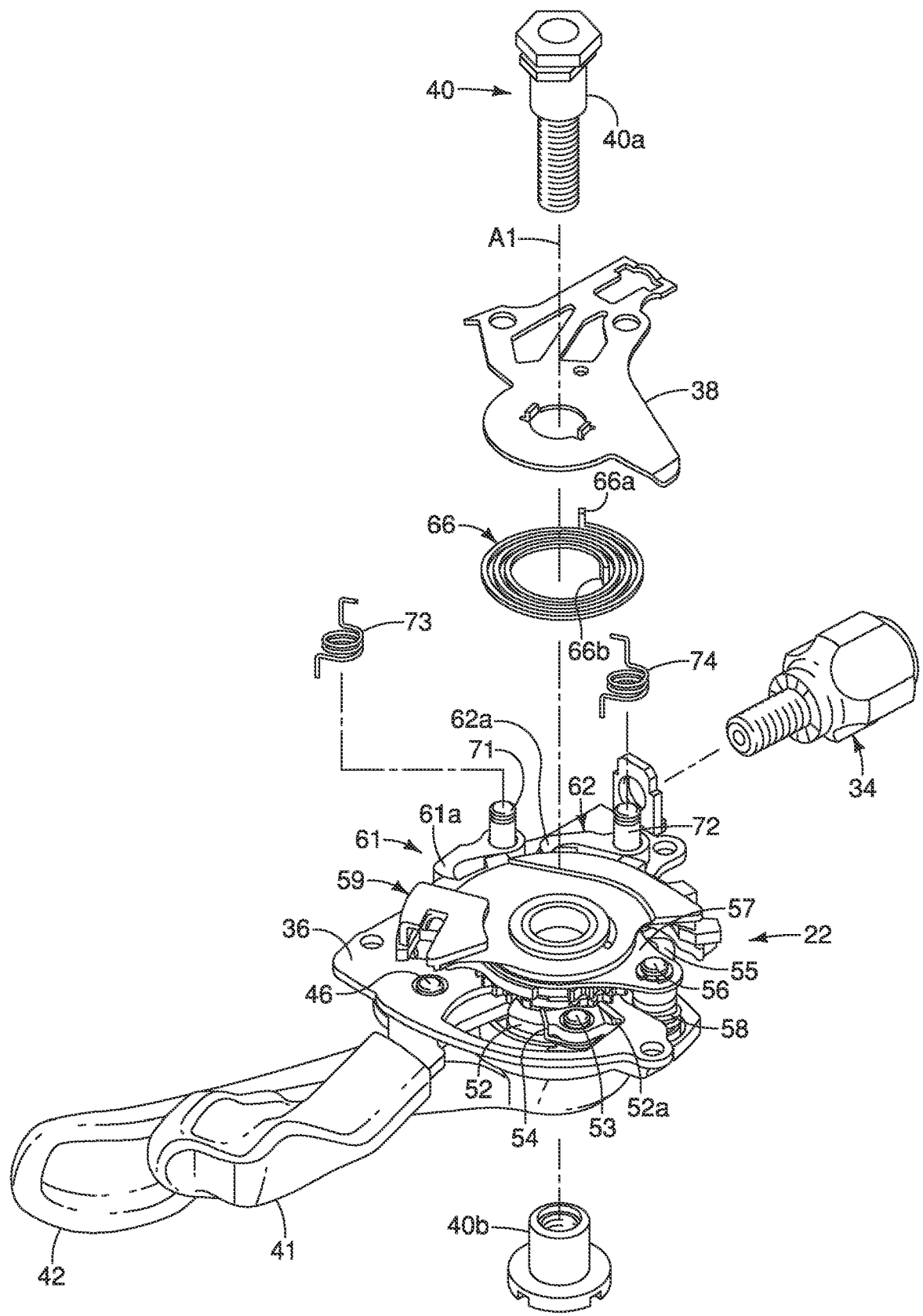
FIG. 3 is a perspective view of the main operating unit illustrated in FIG. 2, with selected parts exploded from the rest of the main operating unit.
Figure 4:
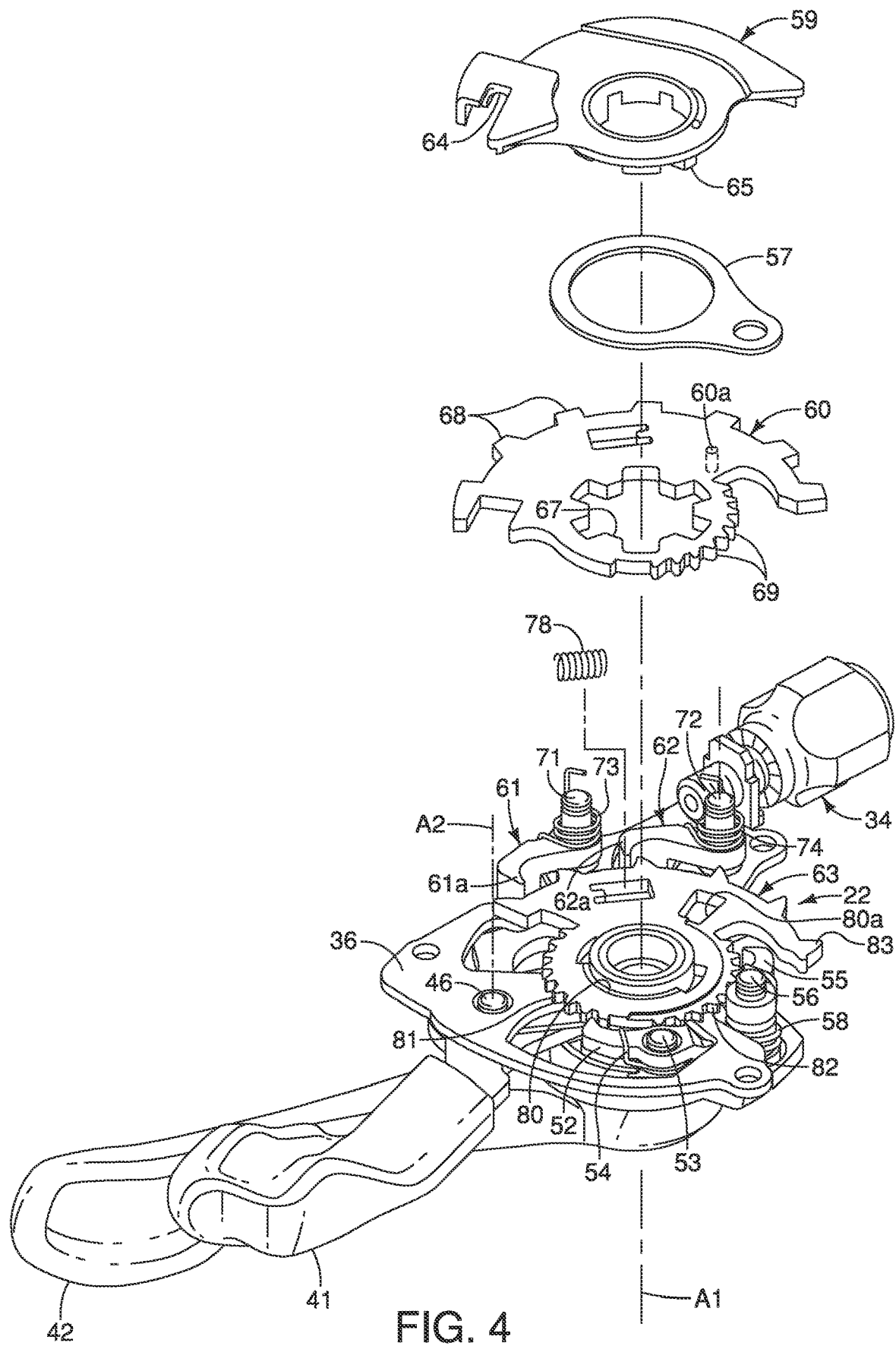
FIG. 4 is another perspective view of the main operating unit illustrated in FIGS. 2 and 3, with selected parts removed and additional selected parts exploded from the rest of the main operating unit.

As seen in FIGS. 2 to 4, the bicycle component positioning device 10 further comprises an internal support structure that basically supports various internal parts of the maintaining mechanism 22. This internal support structure includes a first or bottom stationary support plate 36, a second or top stationary support plate 38 and a support shaft 40. Here, the support shaft 40 includes a bolt 40a and a nut 40b (FIG. 3). The bolt 40a of the support shaft 40 has a longitudinal axis that defines a first or main operating axis A1. The housing 18, the handlebar clamp 20 and the internal support structure (36, 38 and 40) constitutes a fixed or base member which is fixedly coupled to a bicycle part, here the handlebar 12.

As seen in FIGS. 1 to 4, the bicycle component positioning device 10 further comprises a first operating member 41 that is used to release the inner wire 14b from the housing 18. The first operating member 41 is movably arranged to move from a first rest position to a first actuated position. Also the bicycle component positioning device 10 further comprises a second operating member 42 that is used to pull the inner wire 14b into the housing 18. The second operating member 42 is movably arranged to move from a second rest position to a second actuated position. The maintaining mechanism 22 is operated by the first and second operating members 41 and 42 to release and pull the inner wire 14b from the housing 18 in response to operation of the first and second operating members 41 and 42 as discussed below. The maintaining mechanism 22 together with the first and second operating members 41 and 42 constitutes a main operating unit of the bicycle component positioning device 10.

The first and second operating members 41 and 42 are configured as trigger levers that are biased towards the first and second rest positions, respectively, as shown in FIGS. 1 to 4. In particular, a biasing element 44 is provided between the first and second operating members 41 and 42 so that the first and second operating members 41 and 42 are return to the rest positions, respectively, after being operated and released by the user. Thus, as trigger levers, the first and second operating members 41 and 42 automatically return to their rest or home position by the biasing element 44 after being operated and then released by the user.

In the case of the bicycle component positioning device 10 being used as a shifting device, the first and second operating members 41 and 42 constitutes shift members or shift levers. The first operating member 41 constitutes a release member that is in the form of a release lever for releasing the inner wire 14b from the housing 18 as the first operating member 41 is moved by the user from the first rest position to an actuated position as explained later. On the other hand, the second operating member 42 constitutes a pulling member that is in the form of a pulling lever for pulling the inner wire 14b into the housing 18 as the second operating member 42 is moved by the user from the second rest position to an actuated position as explained later. The first and second operating members 41 and 42 also constitute user operating levers or members of the bicycle component positioning device 10.

Figure 5:
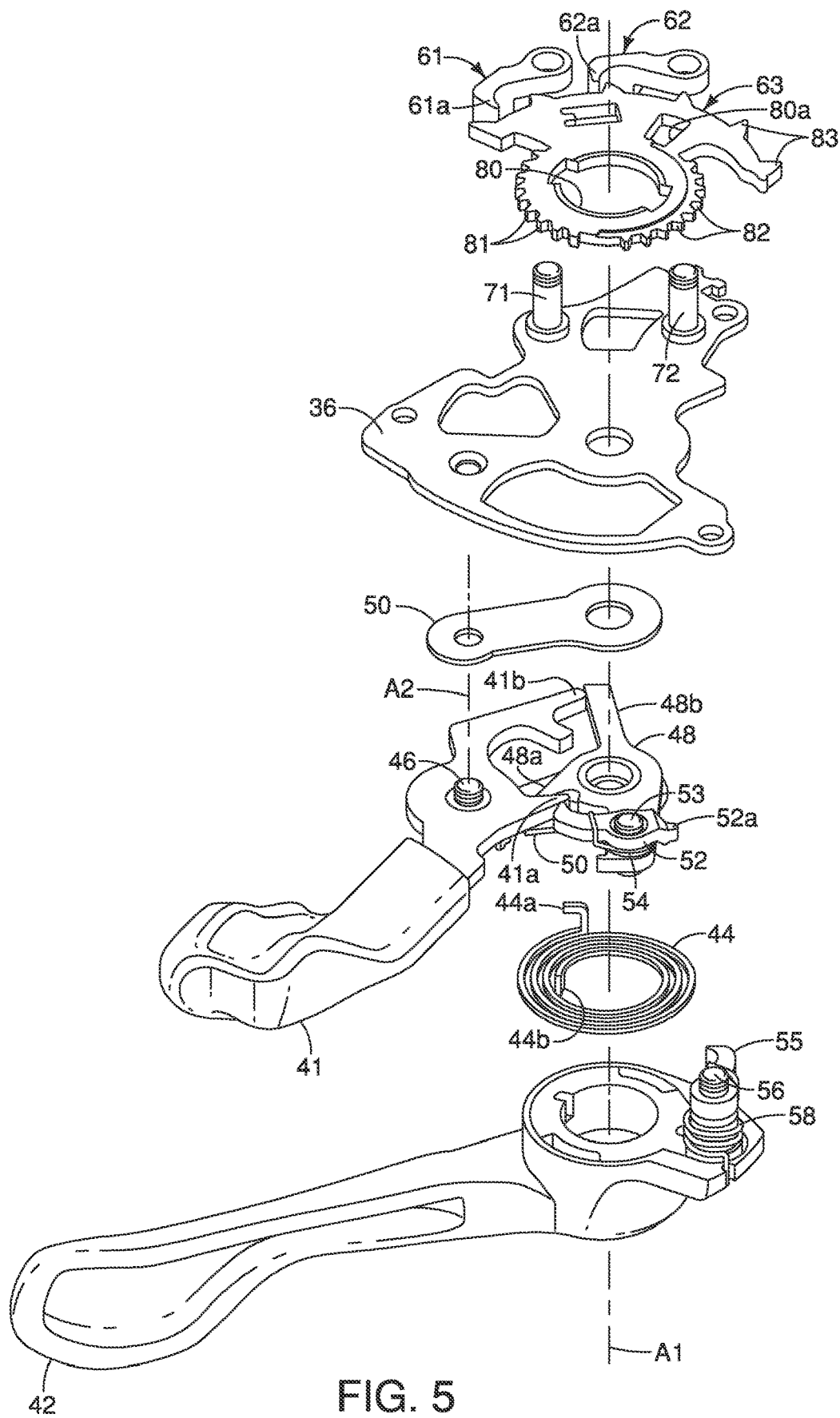
FIG. 5 is another perspective view of the main operating unit illustrated in FIGS. 2 to 4, with selected parts removed and additional selected parts exploded from the rest of the main operating unit.

As seen in FIG. 4, the first operating member 41 is pivotally attached to the bottom stationary support plate 36 by a pivot pin 46 to pivot about a second or secondary operating axis A2. Here, as seen in FIG. 5, the first operating member 41 cooperates with an internal operated part 48 such that the first operating member 41 can be operated in either the direction with respect to the secondary operating axis A2 from the first rest position to perform a releasing operation. Of course, alternatively, the first operating member 41 can be configured such that the first operating member 41 can be pivoted in only one direction to perform a releasing operation. In other words, the internal operated part 48 can be formed with the first operating member 41 as a single piece if it is desirable tier the first operating member 41 to be operated only in a single direction.

Figure 13:
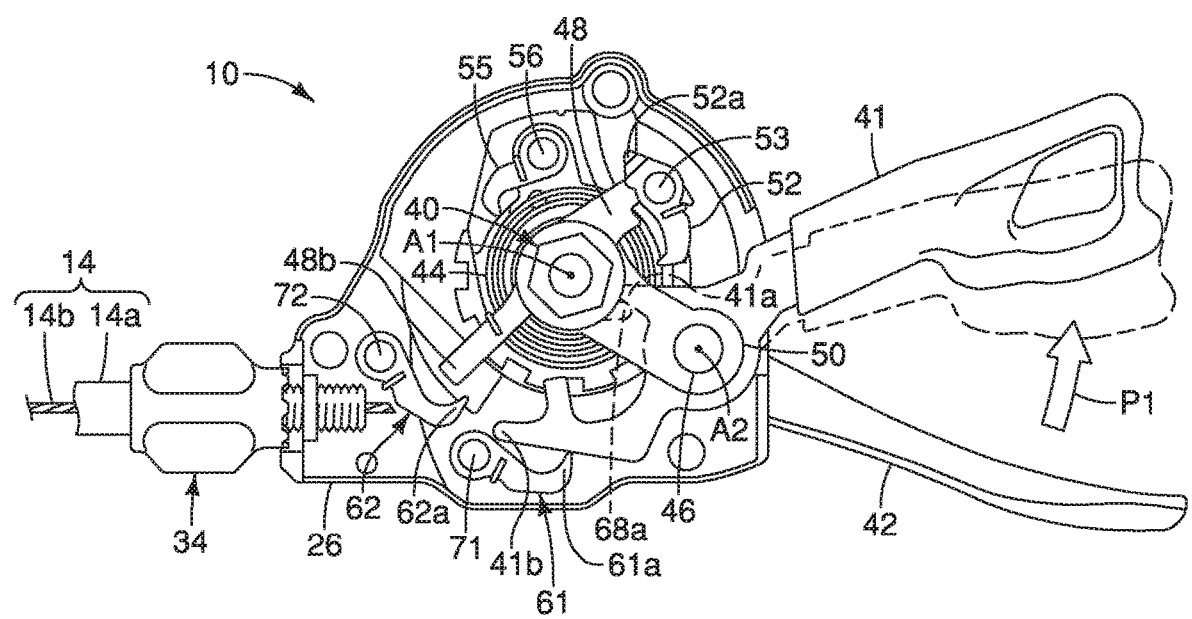
FIG. 13 is a top plan view, similar to FIGS. 10 to 12, of the bicycle component positioning device with the first operating member in the actuated position to start a releasing operation, but with additional parts removed.
Figure 14:
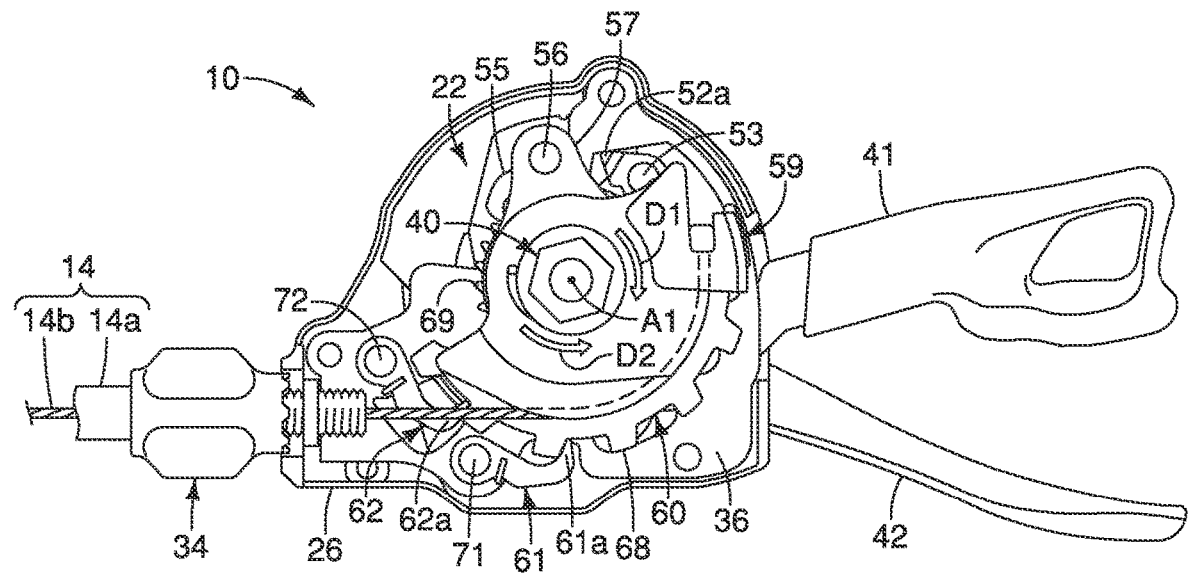
FIG. 14 is a top plan view of the bicycle component positioning device illustrated in FIG. 6, but with the wire takeup member held in a different predetermined position while the first and second operating members are disposed in their rest positions and the second pawl of the second maintaining member engaged with the positioning member to establish another one of the predetermined positions of the wire takeup member.
Figure 15:
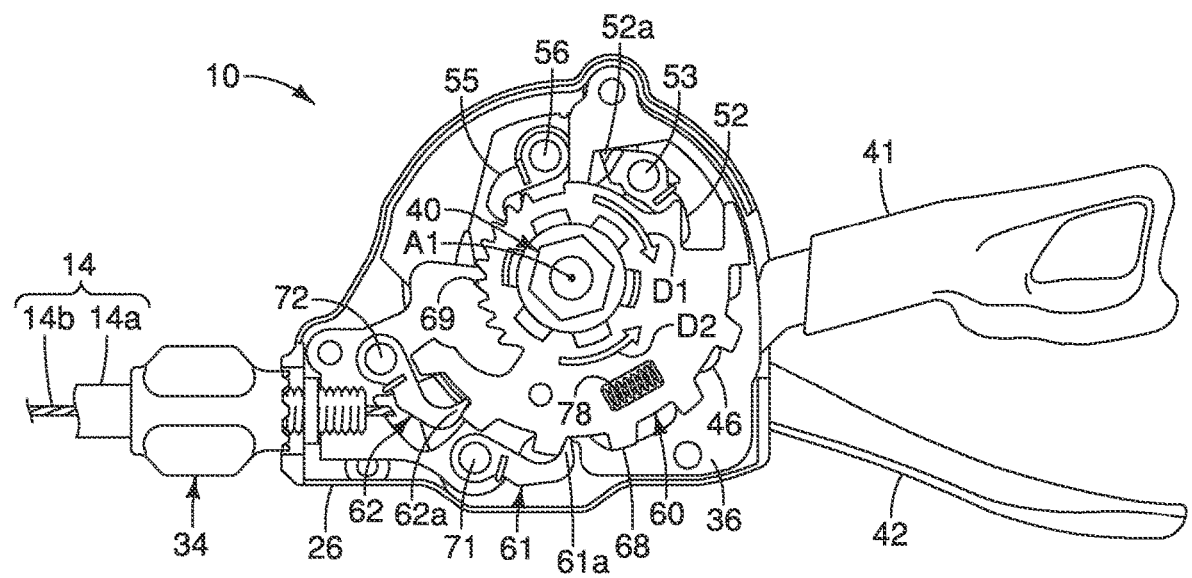
FIG. 15 is a top plan view, similar to FIG. 14, of the bicycle component positioning device with the first and second operating members being disposed in their rest positions, but with additional parts removed.
Figure 16:
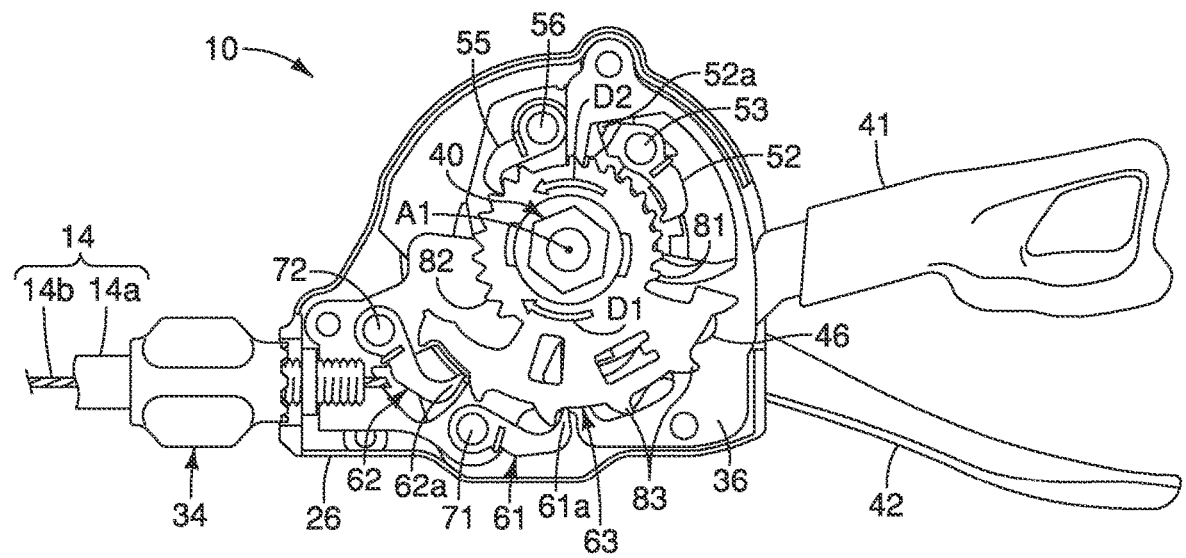
FIG. 16 is a top plan view, similar to FIGS. 14 and 15, of the bicycle component positioning device with the first and second operating members being disposed in their rest positions, but with additional parts removed.
Figure 17:
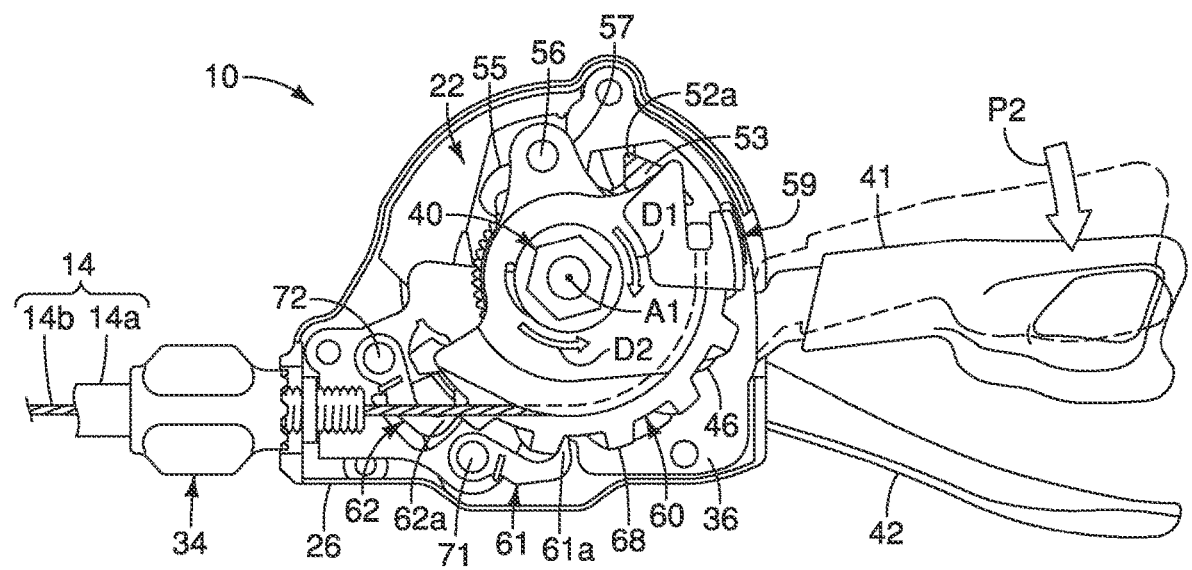
FIG. 17 is a top plan view of the bicycle component positioning device with the first operating member in an actuated position to start a releasing operation by movement of the first operating member in a second operating direction opposite to the first operating direction.
Figure 20:
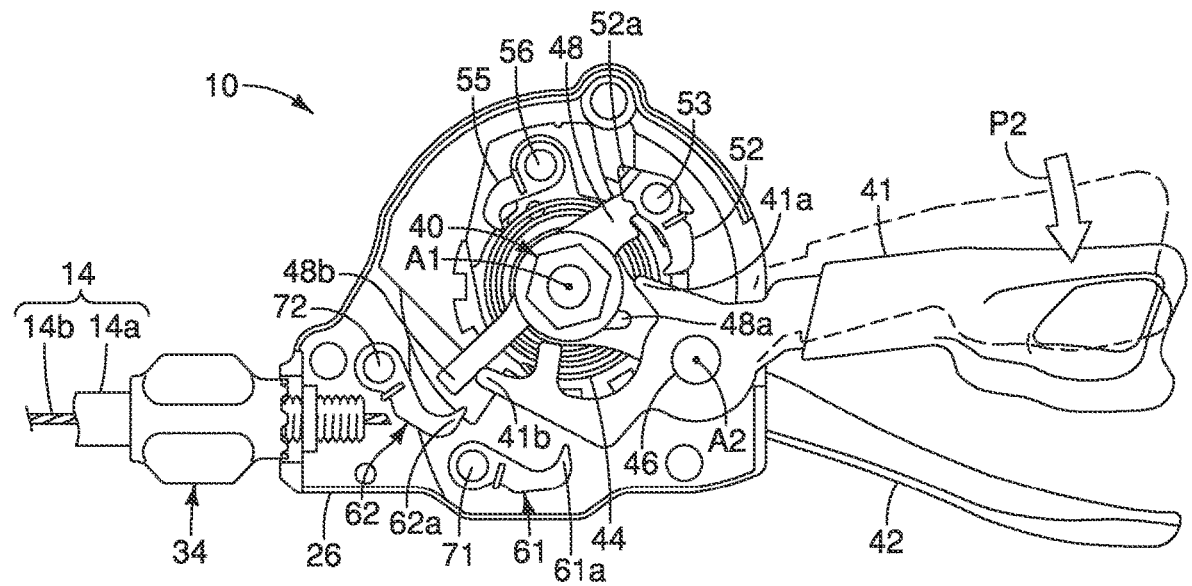
FIG. 20 is a top plan view, similar to FIGS. 17 to 19, of the bicycle component positioning device with the first operating member in the actuated position to start a releasing operation, but with additional parts removed.
Figure 21:
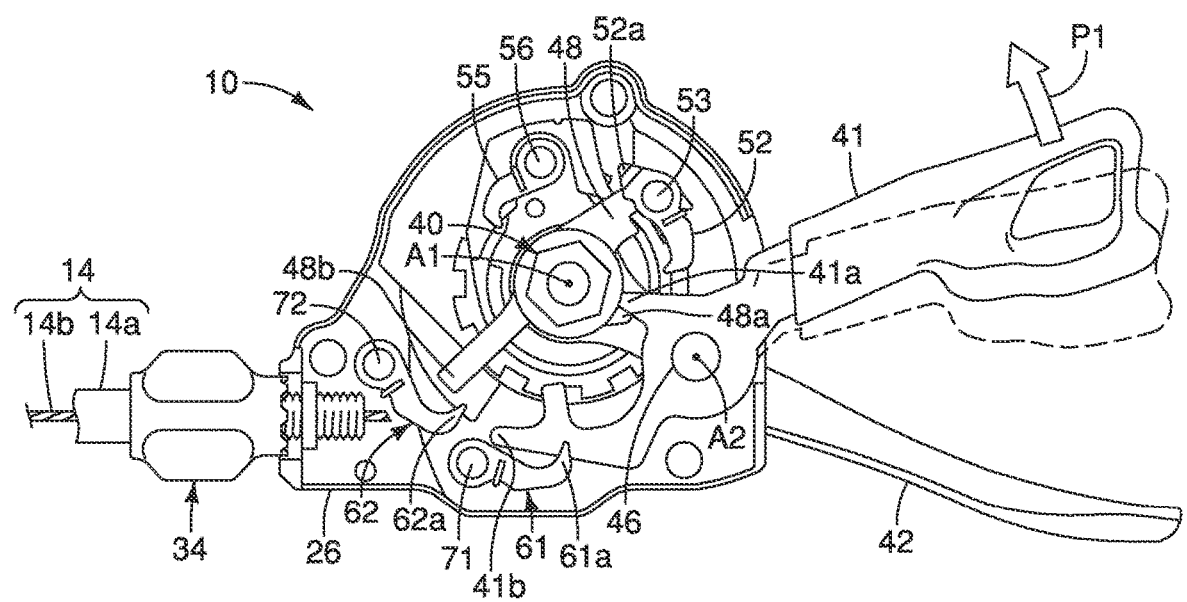
FIG. 21 is a top plan view, similar to FIG. 20, of the bicycle component positioning device but with the first operating member moved in the first operating direction.

As seen in FIGS. 5, 9, 13, 20 and 21, the first operating member 41 includes a first projection 41a and a second projection 41b. While the first operating member 41 is in the first rest position (FIGS. 5 and 9), the first projection 41a contacts a first projection 48a of the internal operated part 48 and the second projection 41b contacts a second projection 48b of the internal operated part 48. Thus, the internal operated part 48 maintains the first operating member 41 stationary while the internal operated part 48 is in its rest position. When the first operating member 41 is pivoted in either direction on the pivot pin 46, the internal operated part 48 is pivoted in a first direction D1 to perform a releasing operation of the inner wire 14b. In particular, as seen in FIGS. 13 and 21, when the first operating member 41 is moved in a first operating direction P1, the first projection 41a pushes the first projection 48a of the internal operated part 48 to pivot the internal operated part 48 in the first direction D1 against the biasing force of the biasing element 44. As seen in FIG. 20, when the first operating member 41 moved in a second operating direction P2, the second projection 41b pushes the second projection 48b of the internal operated part 48 to pivot the internal operated part 48 in the first direction D1 against the biasing force of the biasing element 44.

Preferably, as seen in FIG. 5, the first operating member 41 is stabilized by a pair of stabilizing plates 50 (the bottom plate partially shown in FIG. 5). The first operating member 41 is sandwiched between the stabilizing plates 50. The stabilizing plates 50 are rigid support members that are mounted at one end on the bolt 40a of the support shaft 40 and mounted on the pivot pin 46 at the other end. The internal operated part 48 is pivotally mounted on the support shaft 40 to pivot about the main operating axis A1. The main and secondary operating axes A1 and A2 are offset and parallel to each other.

The biasing element 44 is coupled to the internal operated part 48 to bias the internal operated part 48 in a counterclockwise direction about the main operating axis A1 as viewed from a top plan view. The biasing element 44 is also coupled to the second operating member 42 to bias the second operating member 42 in a clockwise direction about the main operating axis A1 as viewed from a top plan view. In other words, the first and second operating members 41 and 42 are biased in opposite rotational directions to their rest positions. Thus, the biasing element 44 functions as a return spring for returning the first and second operating members 41 and 42 from their actuated positions back to their rest positions, respectively. As a result, the first and second operating members 41 and 42 are trigger members that return to their rest position upon being operated and released.

Figure 7:
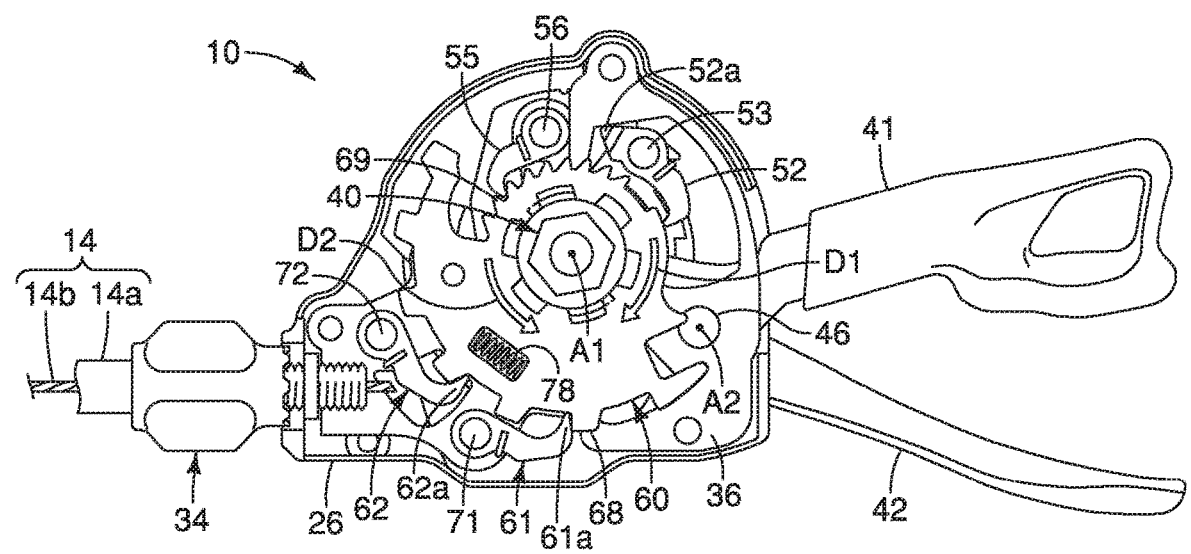
FIG. 7 is a top plan view, similar to FIG. 6, of the bicycle component positioning device with the first and second operating members being disposed in their rest positions, but with additional parts removed.
Figure 8:
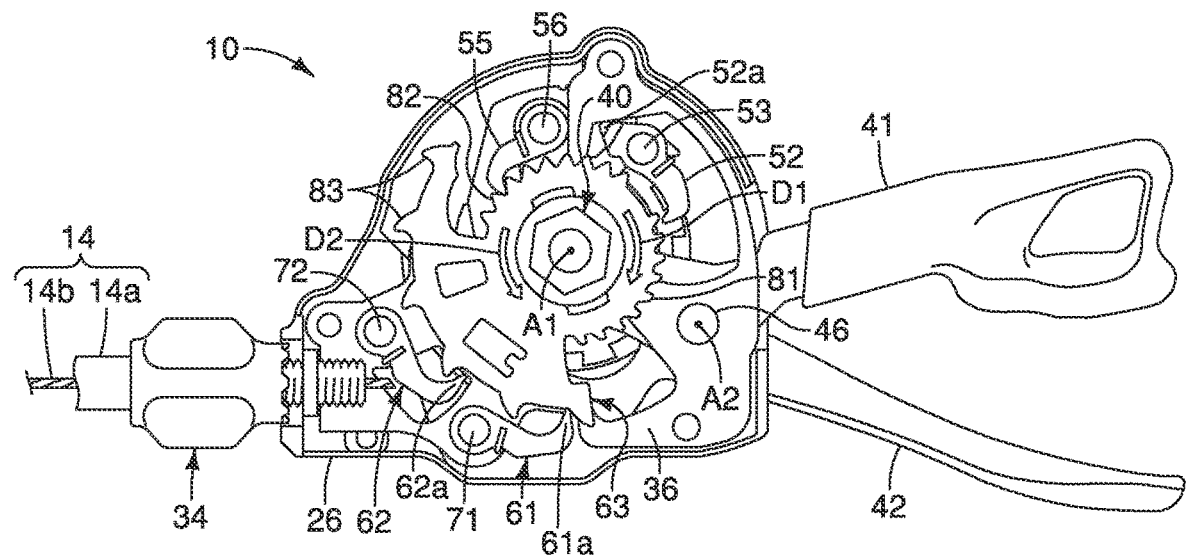
FIG. 8 is a top plan view, similar to FIGS. 6 and 7, of the bicycle component positioning device with the first and second operating members being disposed in their rest positions, but with additional parts removed.
Figure 9:
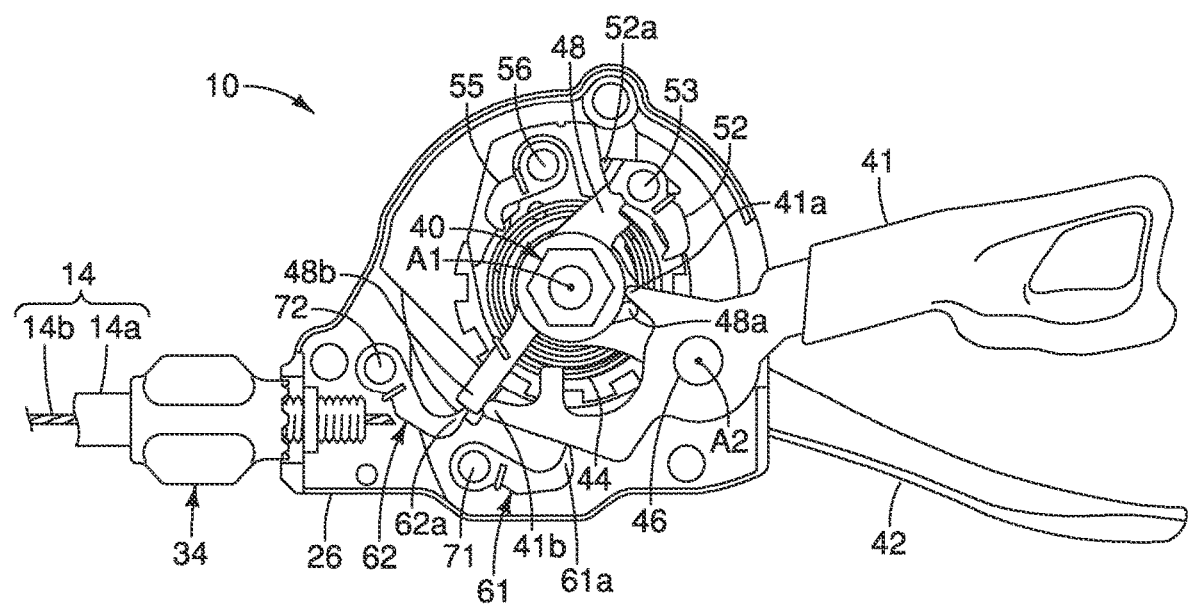
FIG. 9 is a top plan view, similar to FIGS. 6 to 8, of the bicycle component positioning device with the first and second operating members being disposed in their rest positions, but with additional parts removed.

In particular, the biasing element 44 is a flat coil torsion spring that is coiled about the bolt 40a of the support shaft 40. A first end 44a of the biasing element 44 is attached to the internal operated part 48 (i.e., hooked onto the second projection 48b). A second end 44b of the biasing element 44 is attached to the second operating member 42 (i.e., disposed in a hole in a portion of the second operating member 42). The biasing element 44 biases the internal operated part 48 in the second direction D2. The first and second projections 41a and 41b of the first operating member 41 contact the first and second projections 48a and 48b of the internal operated part 48 to maintain the first operating member 41 in a stationary position, as seen in FIGS. 5 and 7, while the first operating member 41 is in the first rest position. In other words, the first operating member 41 and the internal operated part 48 are stationary and held from freely moving white the first operating member 41 is in the first rest position by the biasing force of the biasing element 44.

With this illustrated arrangement, the first operating member 41 can be pivoted in either the first operating direction P1 or the second operating direction P2 to perform a releasing operation of the inner wire 14b as mentioned above. As seen in FIGS. 10 to 13, when the user moves the first operating member 41 on the pivot pin 46 in the first operating direction P1 about the secondary operating axis A2, the first operating member 41 pivots the internal operated part 48 on the support shaft 40 in the first direction D1 about the main operating axis A1 to release the inner wire 14b. As seen in FIGS. 17 to 20, when the user moves the first operating member 41 on the pivot pin 46 in the second operating direction P2 about the secondary operating axis A2, the first operating member 41 also pivots the internal operated part 48 on the support shaft 40 in the first direction D1 about the main operating axis A1 to release the inner wire 14b.

Figure 6:
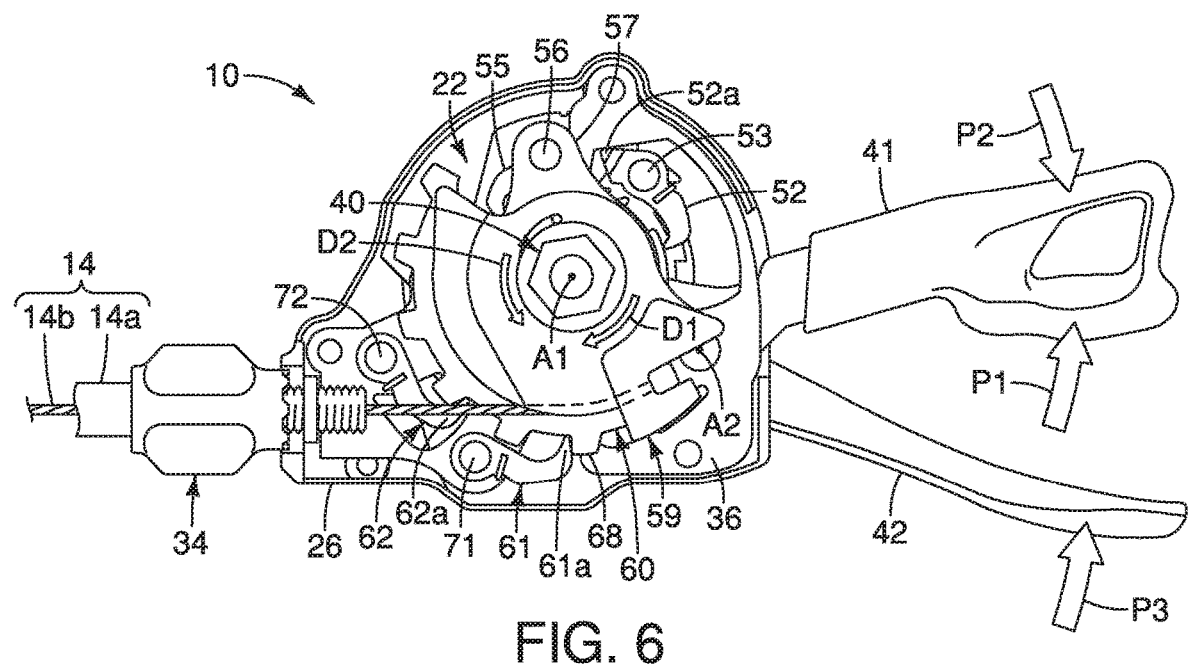
FIG. 6 is a top plan view of the bicycle component positioning device illustrated in FIG. 2 with the first and second operating members being disposed in their rest positions, the first pawl of the first maintaining member engaged with the positioning member to establish one of the predetermined positions of the wire takeup member, and selected parts removed to show the rest positions of certain parts of the main operating unit.

As seen in FIGS. 5 and 6, a release pawl 52 is operatively coupled to the first operating member 41 via the internal operated part 48 for carrying out the releasing operation as explained below. The release pawl 52 is pivotally mounted on the internal operated part 48 by a pivot pin 53. The release pawl 52 is biased by a biasing element 54 (e.g., a coil torsion spring) radially towards the main operating axis A1. However, an end portion 52a (FIG. 6) of the release pawl 52 is forced into contact with the bottom stationary support plate 36 by the biasing force of the biasing element 44 acting on the internal operated part 48. According to this contact, while the first operating member 41 is in the first rest position, the release pawl 52 is pivoted outwardly on the pivot pin 53.

As seen in FIG. 5, the second operating member 42 is operatively coupled to a pulling pawl 55 that is used to pull the inner wire 14b into the housing 18. The pulling pawl 55 is pivotally mounted on the second operating member 42 by a pivot pin 56 that is mounted to the second operating member 42. A support plate 57 (FIGS. 3, 4 and 6) is provided on the bolt 40a of the support shaft 40 to support an upper end of the pivot pin 56. The pulling pawl 55 is biased by a biasing element 58 (e.g., a coil torsion spring) radially towards the main operating axis A1.

Figure 31:
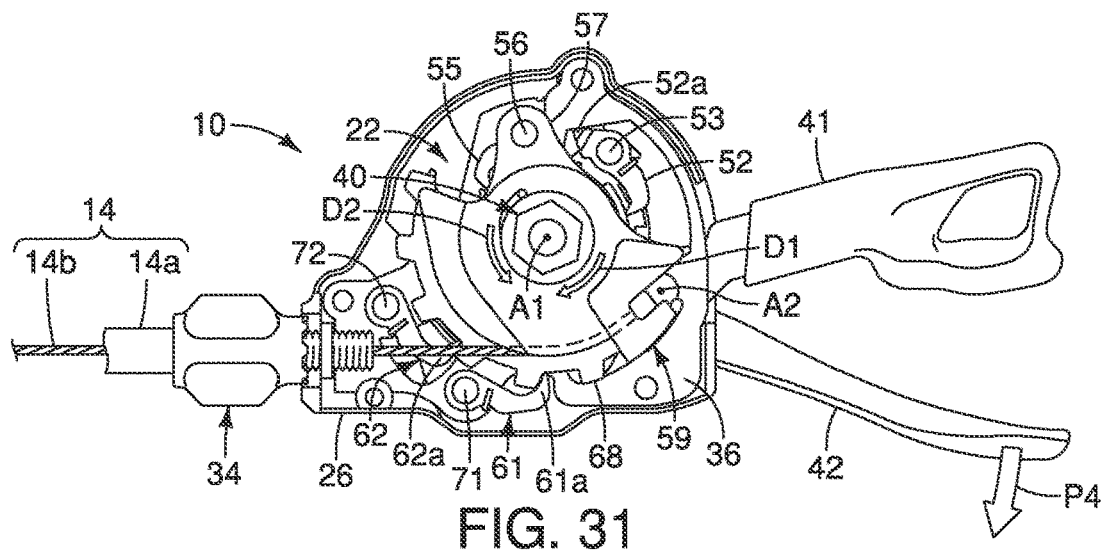
FIG. 31 is a top plan view of the bicycle component positioning device with the second operating member being returned to the rest position after being operated as illustrated in FIGS. 25 to 30 to perform the pulling operation.
Figure 32:
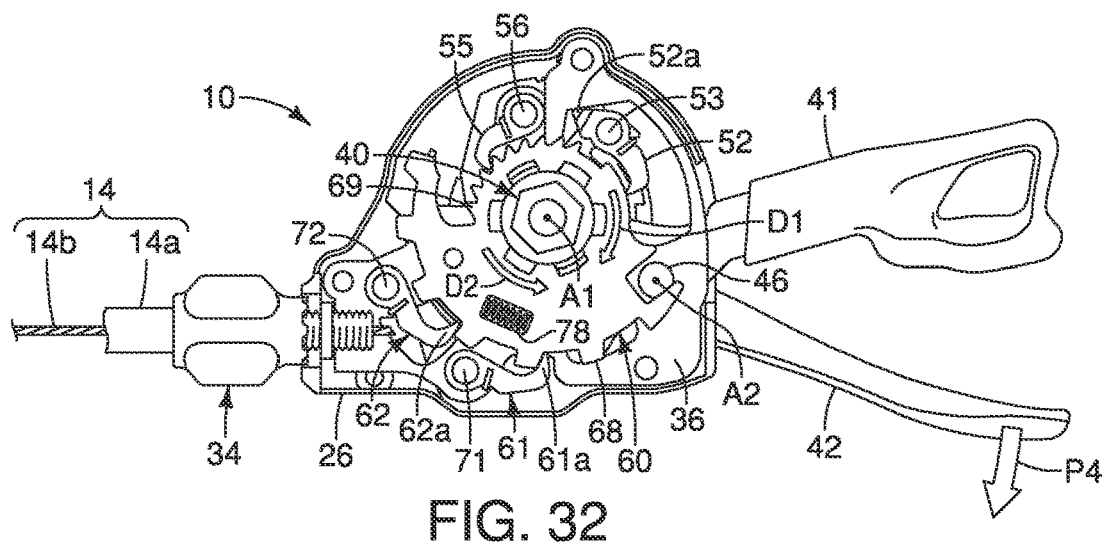
FIG. 32 is a top plan view, similar to FIG. 31, of the bicycle component positioning device with the second operating member being returned to the rest position after being operated as illustrated in FIGS. 25 to 30 to perform the pulling operation, but with additional parts removed.
Figure 33:
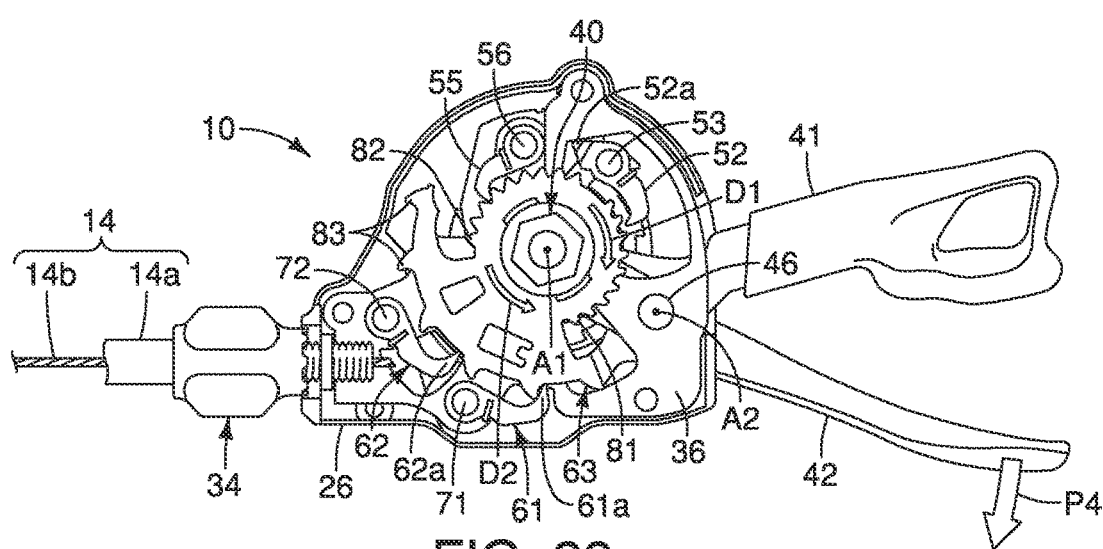
FIG. 33 is a top plan view, similar to FIGS. 31 and 32, of the bicycle component positioning device with the second operating member being returned to the rest position after being operated as illustrated in FIGS. 25 to 30 to perform the pulling operation, but with additional parts removed.

As seen in FIGS. 25 to 30, the second operating member 42 is pivoted in a third operating direction P3 to perform a pulling operation of the inner wire 14b. As seen in FIGS. 31 to 33, the second operating member 42 can only pivot in a fourth direction P4 when the second operating member 42 is returning to the second rest position. As explained below, while the second operating member 42 is in the second rest position, the pulling pawl 55 is pivoted outwardly on the pivot pin 56 during operation of the first operating member 41 on that the pulling pawl 55 does not interfere with the releasing operation as explained below.

Referring now to FIGS. 2 to 6, the maintaining mechanism 22 will now be discussed. The maintaining mechanism 22 is used for holding the inner wire 14b while the first and second operating members 41 and 42 are in their rest positions. The maintaining mechanism 22 of the bicycle component positioning device 10 basically comprises a wire takeup member 59, a positioning member 60, a first maintaining member 61, a second maintaining member 62 and a release member 63. The wire takeup member 59 is rotatably mounted on the support shaft 40 to release or pull the inner wire 14b depending on the rotational direction of the wire takeup member 59. As explained below, the positioning member 60 rotates with the wire takeup member 59, and selectively cooperates with the first and second maintaining members 61 and 62 to maintain the wire takeup member 59 in one of a plurality of predetermined positions. In other words, the positioning member 60 is configured to rotate with the wire takeup member 59 between the plurality of predetermined positions, which are established by selective engagement of one of the first and second maintaining members 61 and 62 with the positioning member 60. When the bicycle component positioning device 10 is a bicycle shifter, as shown, the predetermined positions of the maintaining mechanism 22 correspond to predetermined shift positions. As explained below, the release member 63 is movably mounted to selectively cooperate with the first and second maintaining members 61 and 62 to release the wire takeup member 59 for rotational movement in the first direction D1 about the main operating axis A1. Thus, in the illustrated embodiment, the first direction D1 is a wire releasing direction of the wire takeup member 59.

In the illustrated embodiment, the wire takeup member 59 is a spool that is rotatably mounted on the support shaft 40. As seen in FIG. 4, the wire takeup member 59 has a cable attachment structure 64 for attaching the inner wire 14b. The wire takeup member 59 has a plurality of projections 65 (here four projections) that mate with the positioning member 60.

The wire takeup member 59 is arranged to rotate about a rotational axis (the main operating axis A1) in the first direction D1 and a second direction D2 that is opposite to the first direction D1. Preferably, as seen in FIG. 3, a biasing element 66 is provided for biasing the wire takeup member 59 with respect to the housing 18 in the first direction D1 (the wire releasing direction). In the illustrated embodiment, the biasing element 66 is a flat coil torsion spring that is coiled about the bolt 40a of the support shaft 40. A first end 66a of the biasing element 66 is attached to the top stationary support plate 38 (i.e., hooked onto a portion of the top stationary support plate 38 in the case of the illustrated embodiment). A second end 661) of the biasing element 66 is attached to the wire takeup member 59 (i.e., disposed in a hole in a portion of the wire takeup member 59 in the case of the illustrated embodiment). Alternatively, the biasing element 66 can be eliminated and the wire takeup member 59 can be biased in the first direction D1 by a spring of the bicycle component that is operated by the bicycle component positioning device 10.

The first operating member 41 is pivotally mounted on an axis (the secondary operating axis A2) that is offset from the rotational axis (the main operating axis A1) of the wire takeup member 59. Operation of the first operating member 41 releases the wire takeup member 59 such that the biasing element 66 (i.e., a torsion spring) rotates the wire takeup member 59 in the first direction D as the first operating member 41 is moved by the user from the first rest position (e.g., see FIGS. 6 to 9 and 14 to 16) to the first actuated position (e.g., see FIGS. 10 to 13 and 17 to 20).

Figure 22:
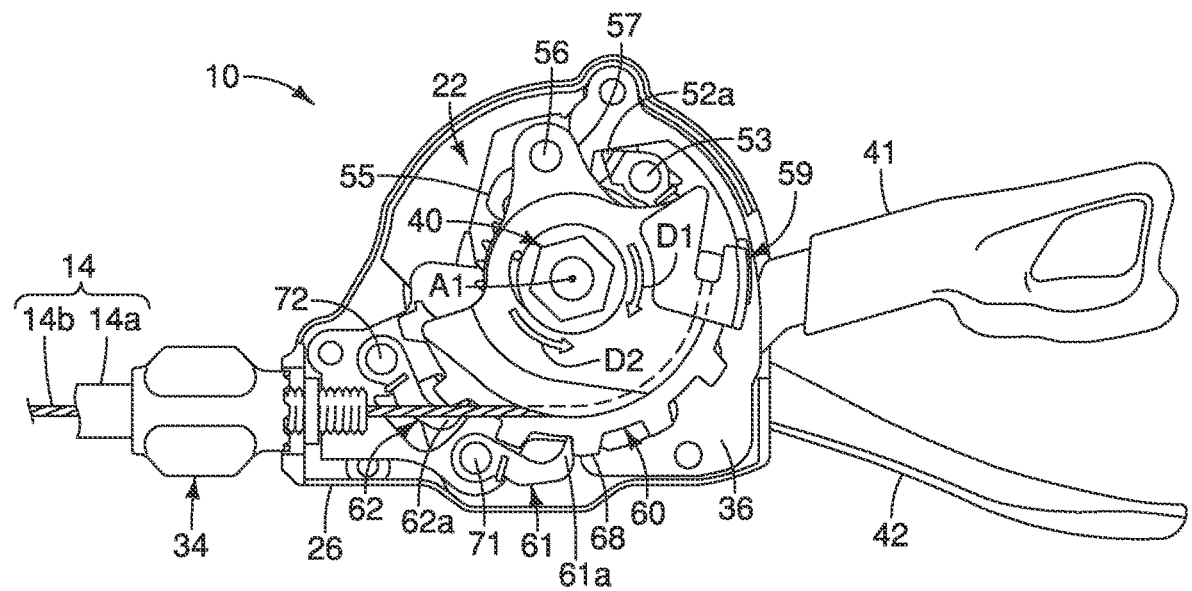
FIG. 22 is a top plan view of the bicycle component positioning device with the first operating member moved back to the rest position from the actuated position shown in FIGS. 17 to 19 such that a new position of the wire take up member is attained.
Figure 23:
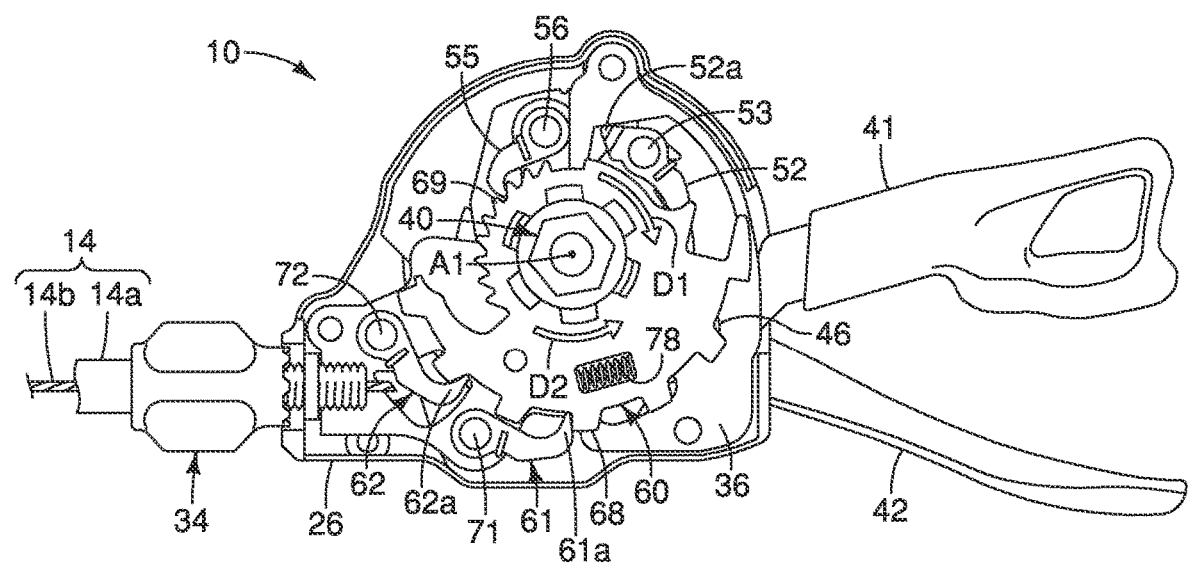
FIG. 23 is a top plan view, similar to FIG. 22, of the bicycle component positioning device with the first operating member moved back to the rest position from the actuated position shown in FIGS. 17 to 19 such that the new position of the wire takeup member is attained, but with additional parts removed.
Figure 24:
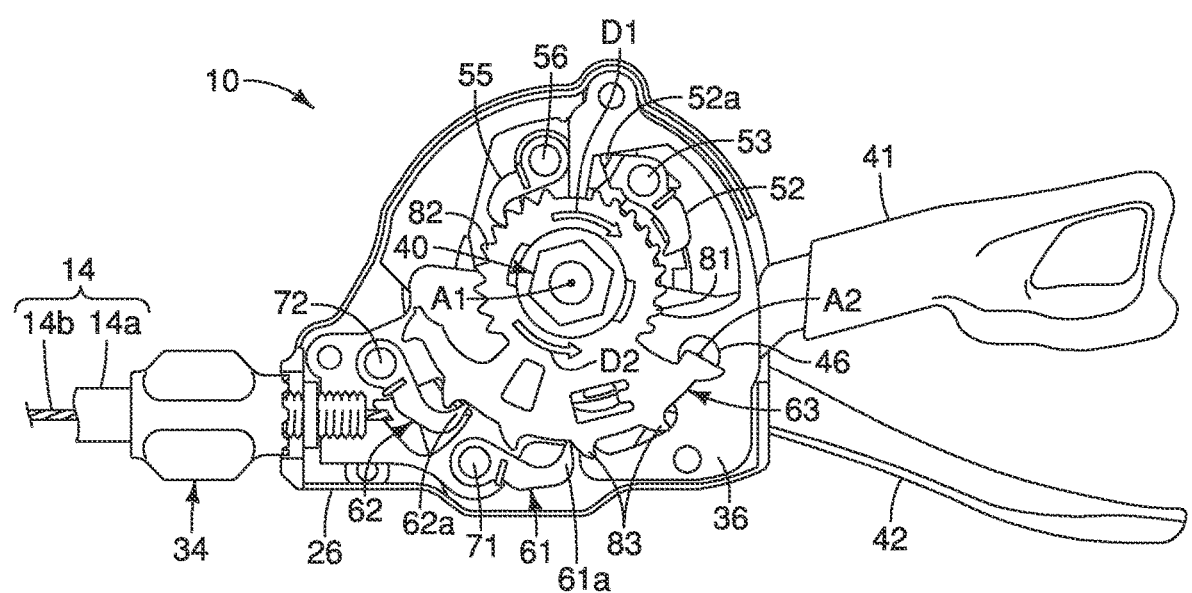
FIG. 24 is a top plan view, similar to FIGS. 22 and 23, of the bicycle component positioning device with the first operating member moved back to the rest position from the actuated position shown in FIGS. 17 to 19 such that the new position of the wire takeup member is attained, but with additional parts removed.
Figure 25:
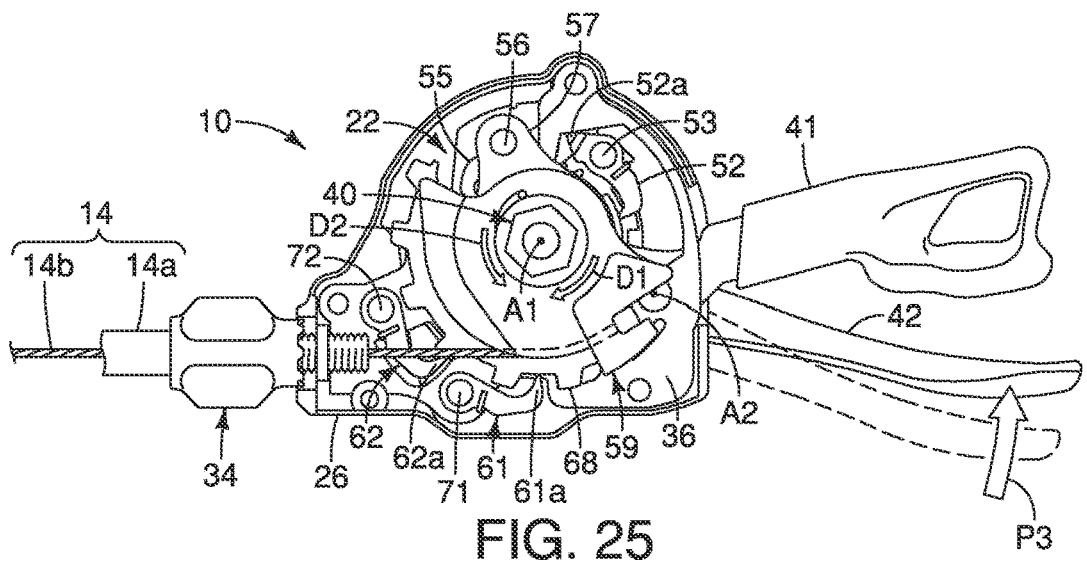
FIG. 25 is a top plan view of the bicycle component positioning device with the second operating member in an actuated position to perform a pulling operation.
Figure 26:
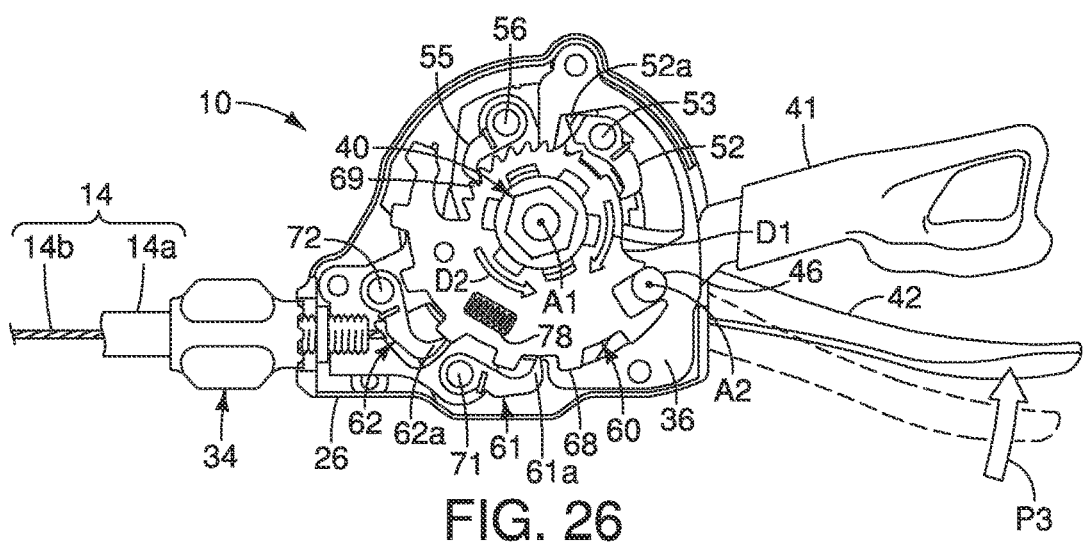
FIG. 26 is a top plan view, similar to FIG. 25, of the bicycle component positioning device with the second operating member in the actuated position to perform a pulling operation, but with additional parts removed.
Figure 27:
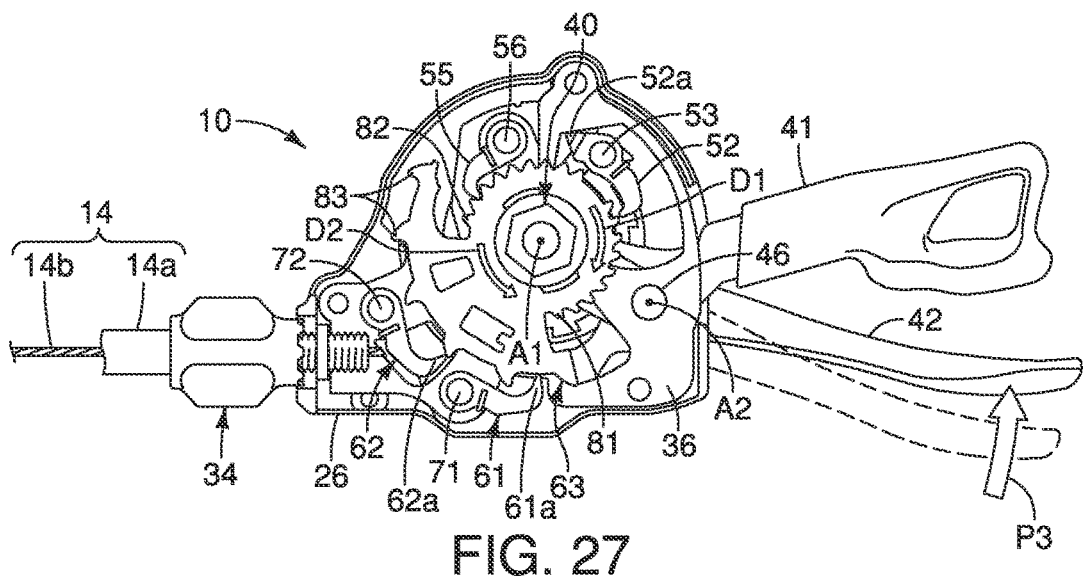
FIG. 27 is a top plan view, similar to FIGS. 25 and 26, of the bicycle component positioning device with the second operating member in the actuated position to perform a pulling operation, but with additional parts removed.
Figure 28:
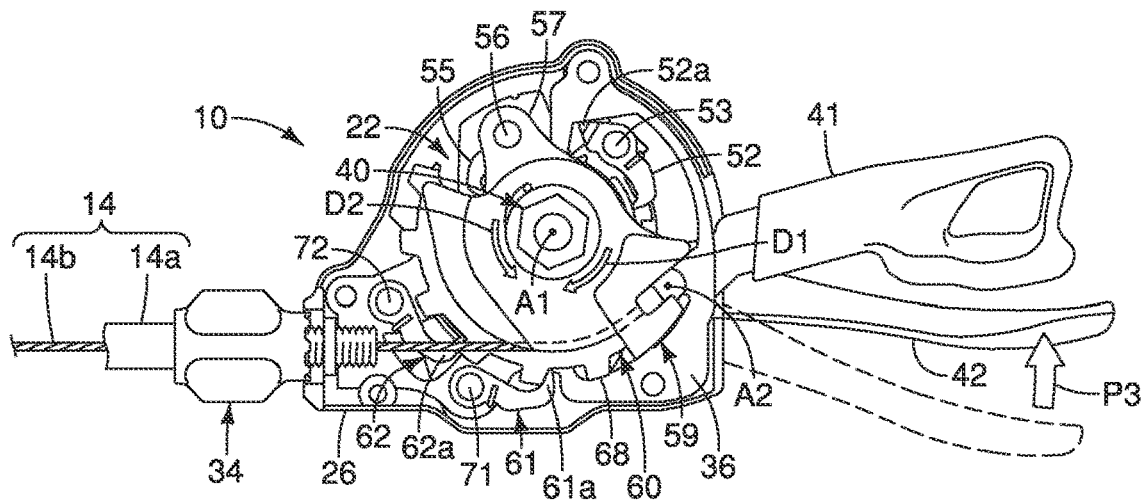
FIG. 28 is a top plan view of the bicycle component positioning device with the second operating member being operated farther than the actuated position illustrated in FIGS. 25 to 27 to perform the pulling operation.
Figure 29:
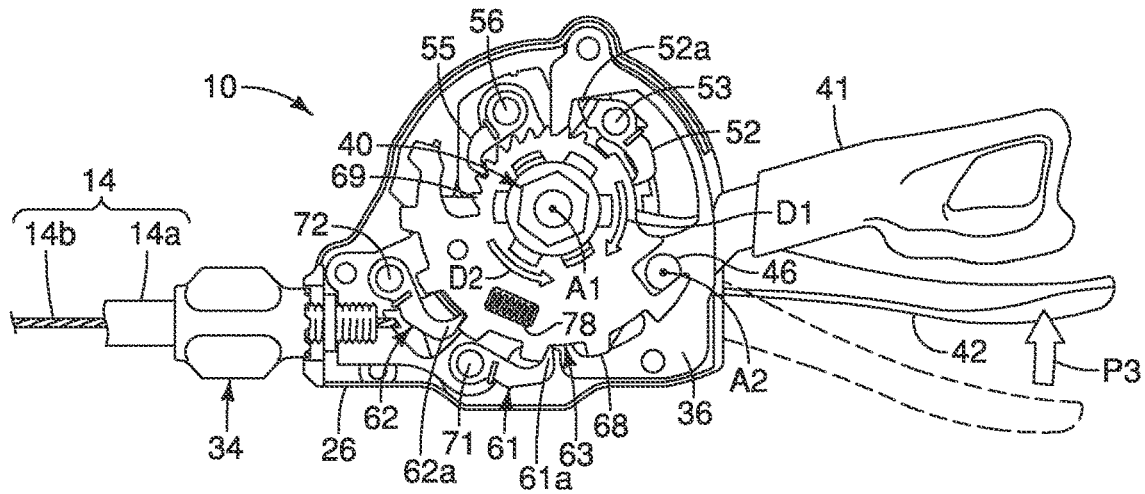
FIG. 29 is a top plan view, similar to FIG. 28, of the bicycle component positioning device with the second operating member in the farther actuated position to perform the pulling operation, but with additional parts removed.
Figure 30:
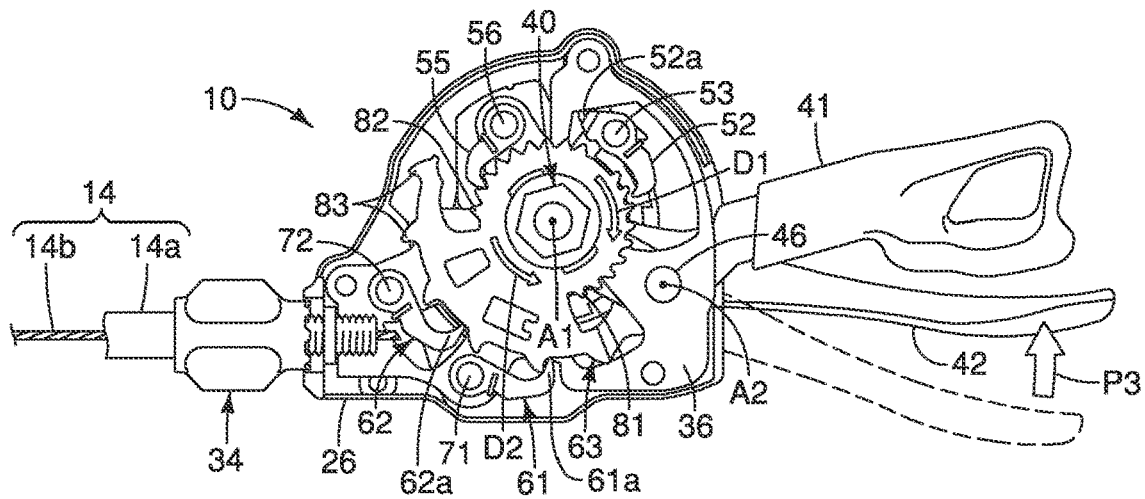
FIG. 30 is a top plan view, similar to FIGS. 28 and 29, of the bicycle component positioning device with the second operating member in the farther actuated position to perform the pulling operation, but with additional parts removed.

The second operating member 42 is pivotally mounted on an axis (the main operating axis A1) that is coaxial with the rotational axis (the main operating axis A1) of the wire takeup member 59. Basically, the second operating member 42 is movably arranged to rotate the positioning member 60 and the wire takeup member 59 in the second direction D2 as the second operating member 42 moves from the second rest position (e.g., see FIGS. 22 to 24) to the second actuated position (e.g., see FIGS. 25 to 30). As seen in FIGS. 25 to 30, in the illustrated embodiment, operation of the second operating member 42 rotates the wire takeup member 59 in the second direction D2 (a wire pulling direction) as the second operating member 42 is moved by the user from the second rest position (FIGS. 22 to 24) to the second actuated position (FIGS. 25 to 30).

As best seen in FIG. 4, the positioning member 60 is basically a rigid plate that is fixed to the wire takeup member 59. In particular, the positioning member 60 has a non-circular opening 67 that mates with the projections 65 of the wire takeup member 59 so that the wire takeup member 59 and the positioning member 60 rotate together as a unit. The positioning member 60 includes a plurality of positioning teeth 68. As seen in FIGS. 6 to 9 and 14 to 16, the positioning teeth 68 are selectively engaged by the first and second maintaining members 61 and 62 to hold the wire takeup member 59 and the positioning member 60 from rotating under the biasing force of the biasing element 66. The positioning member 60 includes a plurality of pulling teeth 69. During operation of the second operating member 42, as seen in FIGS. 25 to 30, the pulling pawl 55 engages the pulling teeth 69 and rotates the positioning member 60 and the wire takeup member 59 in the second direction D2 (the wire pulling direction) as the second operating member 42 moves from the second rest position to the second actuated position. The pulling pawl 55 is biased so as to engage the pulling teeth 69 while the first and second operating member 42 are in the first and second rest positions, respectively. The pulling pawl 55 is disengaged from the pulling teeth 69 as the first operating member 41 moves from the first rest position toward the first actuated position.

Referring back to FIGS. 2 to 4, the first maintaining member 61 includes a first pawl 61a and the second maintaining member 62 includes a second pawl 62a. The first pawl 61a of the first maintaining member 61 selectively engages one of the positioning teeth [[83]]68 of the positioning member 60. The second pawl 62a of the second maintaining member 62 selectively engages one of the positioning teeth 68 of the positioning member 60. Basically, only one of the first and second pawls 61a and 62a engages one of the positioning teeth 68 at any given time. More particularly, the first and second pawls 61a and 62a alternately move between engagement with and disengagement from one of the positioning teeth 68 of the positioning member 60 as the positioning member 60 moves from one of the predetermined positions to the next one of the predetermined positions.

The first maintaining member 61 is pivotally mounted on a pivot pin 71 that extends between the bottom stationary support plate 36 and the top stationary support plate 38. The first maintaining member 61 is configured to selectively move into and out of engagement with the positioning member 60 as the release member 63 is moved by the operation of the first operating member 41. The first maintaining member 61 is configured to move between a first maintaining position (e.g., see FIGS. 6 and 7) to maintain the positioning member 60 in one of the predetermined positions and a first releasing position (e.g., see FIGS. 10 and 11) to release the positioning member 60.

Similarly, the second maintaining member 62 is pivotally mounted on a pivot pin 72 that extends between the bottom stationary support plate 36 and the top stationary support plate 38. The second maintaining member 62 is also configured to selectively move into and out of engagement with the positioning member 60 as the release member 63 is moved by the operation of the first operating member 41. The second maintaining member 62 is configured to move between a second maintaining position (e.g., see FIGS. 14 and 15) to maintain the positioning member 60 in one of the predetermined positions and a second releasing position (e.g., see FIGS. 17 and 18) to release the positioning member 60.

A biasing element 73 is provided to bias the first maintaining member 61 towards a peripheral edge of the positioning member 60 such that the first pawl 61a is biased towards the first maintaining position. The biasing element 73 is a coil torsion spring that is coiled about the pivot pin 71 with one end engaged with the top stationary support plate 38 (i.e., hooked onto the top stationary support plate 38) and the other end, engaged with the first maintaining member 61 (i.e., hooked onto the first maintaining member 61).

Similarly, a biasing element 74 is provided to bias the second maintaining member 62 towards the peripheral edge of the positioning member 60 such that the second pawl 62a is biased towards the second maintaining position. The biasing element 74 is a coil torsion spring that is coiled about the pivot pin 72 with one end engaged with the top stationary support plate 38 (i.e., hooked onto the top stationary support plate 38) and the other end engaged with the second maintaining member 62 (i.e., hooked onto the second maintaining member [[61]] 62). The release member 63 includes teeth 83 that alternately moves the first and second maintaining members 61 and 62 (e.g., the first and second pawls 61a and 62a) out of engagement with the positioning member 60 by the operation of the first operating member 41.

Figure 11:
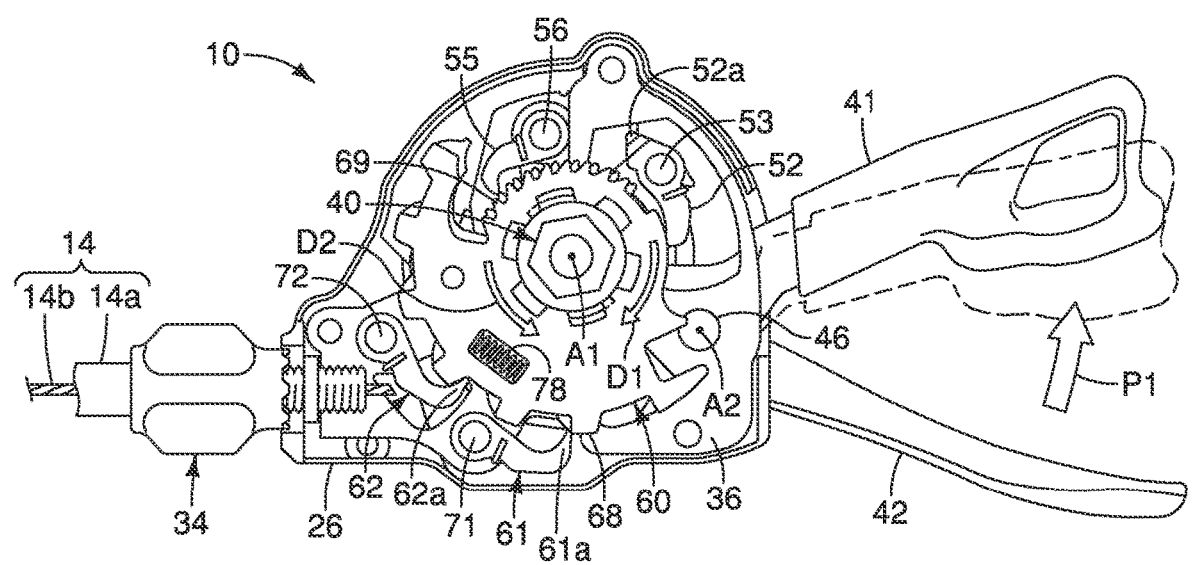
FIG. 11 is a top plan view, similar to FIG. 10, of the bicycle component positioning device with the first operating member in the actuated position to start a releasing operation, but with additional parts removed.
Figure 12:
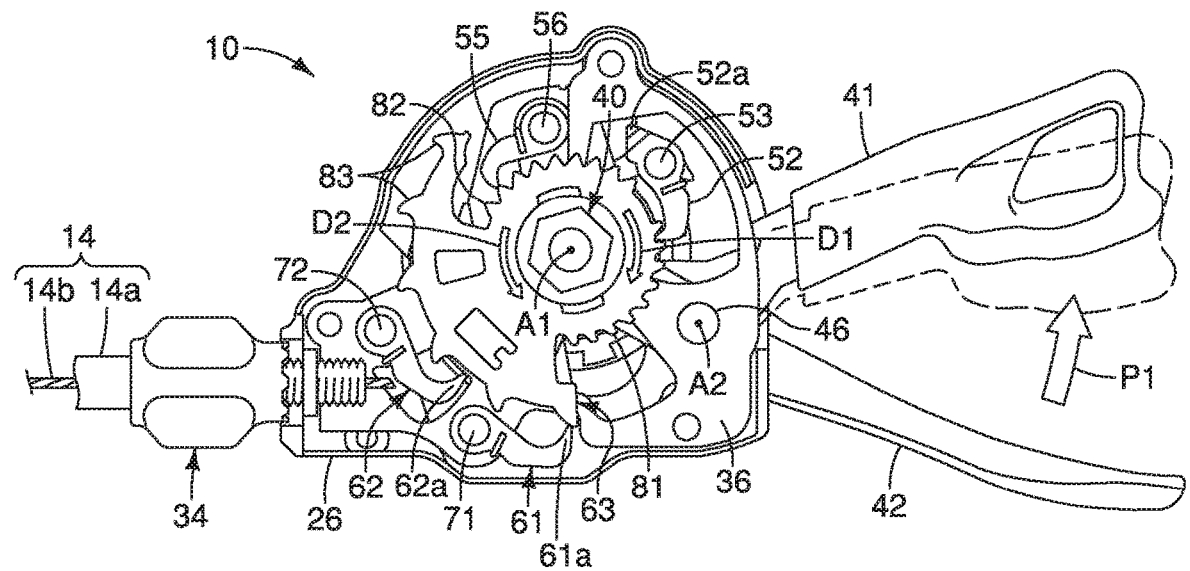
FIG. 12 is a top plan view, similar to FIGS. 10 and 11, of the bicycle component positioning device with the first operating member in the actuated position to start a releasing operation, but with additional parts removed.
Figure 18:
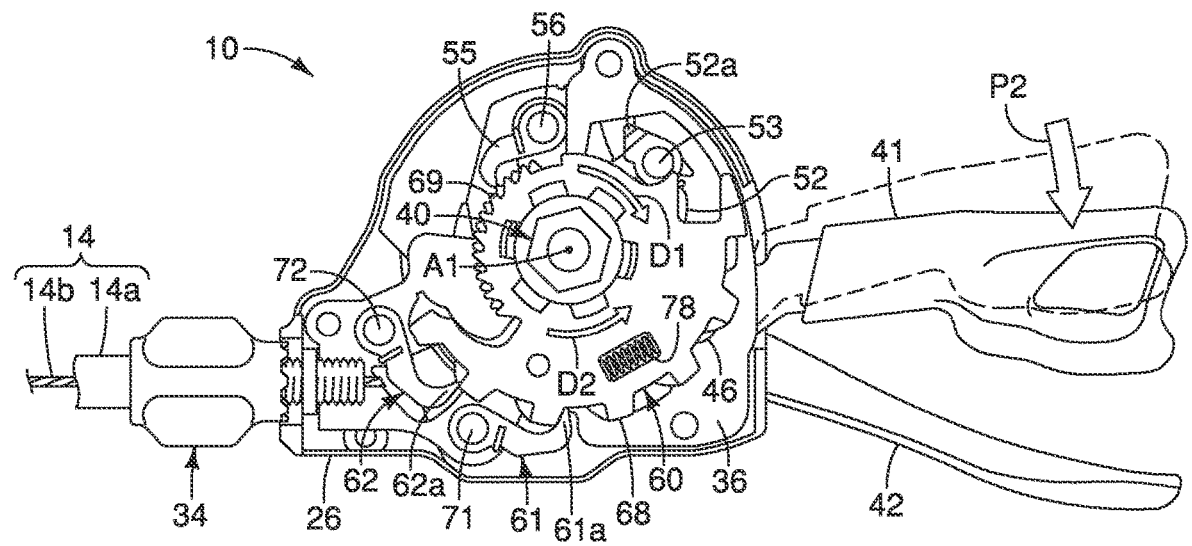
FIG. 18 is a top plan view, similar to FIG. 17, of the bicycle component positioning device with the first operating member in the actuated position to start a releasing operation, but with additional parts removed.
Figure 19:
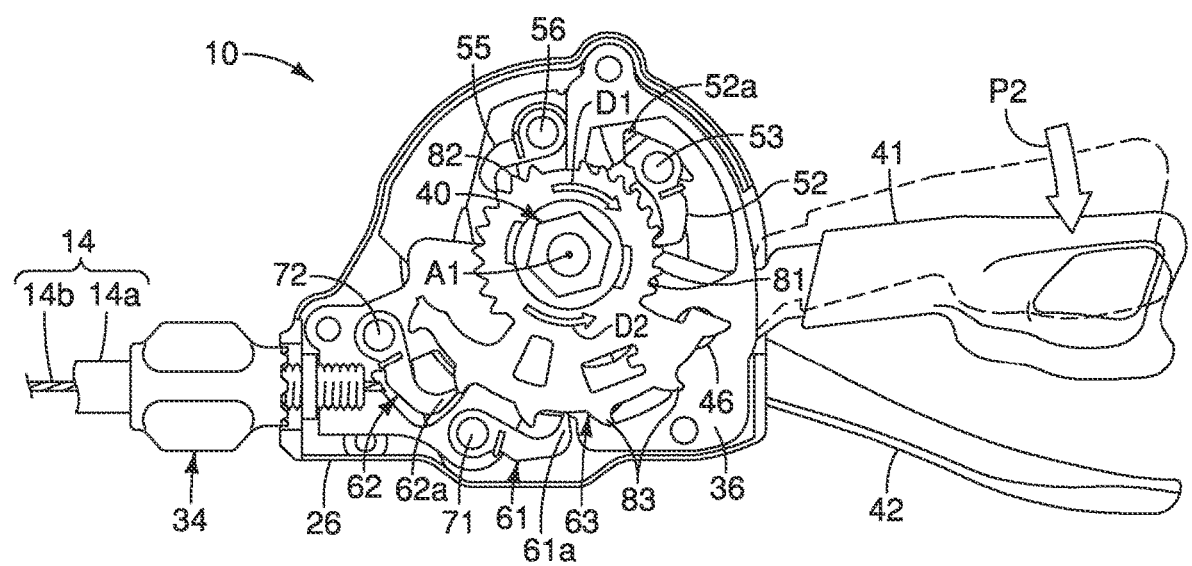
FIG. 19 is a top plan view, similar to FIGS. 17 and 18, of the bicycle component positioning device with the first operating member in the actuated position to start a releasing operation, but with additional parts removed.

Referring to FIGS. 7, 8, 11 15, 16 and 18, the release member 63 is basically coupled to the wire takeup member 59 with a small amount of rotational play. Since the positioning member 60 is fixed to the wire takeup member 59, the release member 63 is movably coupled to the positioning member 60 to move in the first direction D1 within a prescribed range relative to the positioning member 60 between a non-release position (FIGS. 7, 8 15 and 16) and a release position (FIGS. 11 and 18). The release member 63 alternatively holds one of the first and second maintaining members 61 and 62 out of engagement with the positioning teeth 68 of the positioning member 60 while the release member 63 is in the release position.

A biasing member 78 is disposed between the release member 63 and the positioning member 60 for biasing the release member 63 to the non-release position. In the illustrated embodiment, the biasing member 78 is a compression spring that is disposed in openings of the positioning member 60 and the release member 63. The release member 63 alternatively moves the first pawl 61a of the first maintaining member 61 towards the first releasing position and moves the second pawl 62a of the second maintaining member 62 towards the second releasing position as the release member 63 moves in the first direction D1.

Referring again to FIGS. 4 and 5, the release member 63 is basically a rigid plate. The release member 63 has a non-circular opening 80 that mates with part of the projections 65 (here, two projections) that have larger axial length than other projections 65 of the wire takeup member 59. The non-circular opening 80 is configured so that the release member 63 can rotate relative to the wire takeup member 59 within a prescribed range during a releasing operation of the first operating member 41 as mentioned above. The release member 63 further has a non-circular opening 80a that is arranged to receive a pin 60a provided on the positioning member 60. The non-circular opening 80a and the pin 60a have the same function as the non-circular opening 80 and the part of the projections 65. Due to the biasing member 78 biasing the release member 63 to the non-release position, the releasing member 63 is configured to move in the second direction D2 in response to a rotation of the wire takeup member 59 in the second direction D2 as a result of the operation of the second operating member 42.

The release member 63 includes a plurality of release teeth 81 that are engaged, by the release pawl 52 to move the release member 63 in the first direction D1 as the first operating member 41 moves from the first rest position (e.g., see FIGS. 6 to 9 and 14 to 16) to the first actuated position (e.g., see FIGS. 10 to 13 and 17 to 20). The release pawl 52 is biased by the biasing element 54 so as to engage with the release teeth 81 upon movement of the first operating member 41 from the first rest position to the first actuated position. However, the release pawl 52 is held disengaged from the release teeth 81 while the first operating member is in the first rest position. In particular, the release pawl 52 is pushed against the bottom stationary support plate 36 by the biasing force of the biasing element 44 so as to pivot the release pawl 52 outwardly from the release teeth 81 while the first operating member is in the first rest position as described above.

The release member 63 includes a plurality of abutments 82 that move the pulling pawl 55 out of engagement with the pulling teeth 69 as the release member 63 moves in the first direction D1 by movement of the first operating member 41 from the first rest position to the first actuated position. Thus, with this arrangement, the pulling pawl 55 is held in a disengaged position from the pulling teeth 69 while the second operating member 42 is in the second rest position. In other words, while the second operating member 42 is in the second rest position, the pulling pawl 55 is pivoted outwardly on the pivot pin 56 during operation of the first operating member 41 so that the pulling pawl 55 does not interfere with the releasing operation of the wire takeup member 59.

Figure 10:
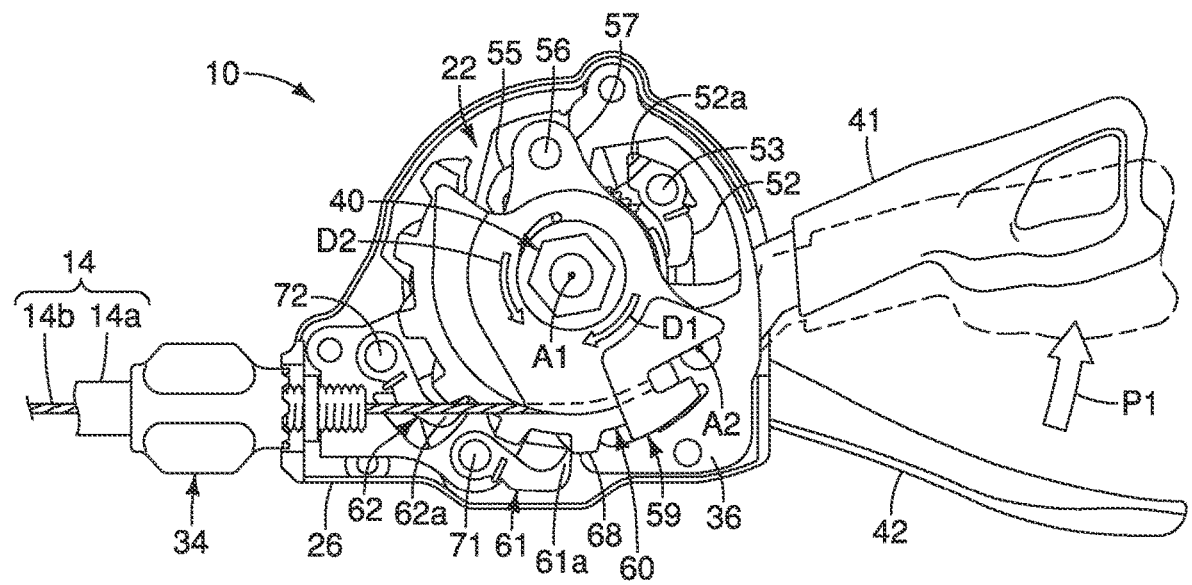
FIG. 10 is a top plan view of the bicycle component positioning device with the first operating member in an actuated position to start a releasing operation by movement of the first operating member in a first operating direction.

The releasing member 63 is configured to move in the first direction D1 so as to selectively move the first maintaining member 61 between the first maintaining position (e.g., see FIGS. 6 and 7) and the first releasing position (e.g., see FIGS. 10 and 11). Also the releasing member 63 is configured to move in the first direction D1 so as to selectively move the second maintaining member 62 between the second maintaining position see FIGS. 14 and 15) and the second releasing position (e.g., see FIGS. 17 and 18). Thus, the first operating member 41 is movably arranged to move the release member 63 in the first direction D1 from the non-release position towards the release position as the first operating member 41 moves from the first rest position to the first actuated position.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the term "rest position" refers to a state in which a movable part (e.g., the first and second operating members) remains stationary without the need of a user holding any part of the bicycle component positioning device 10 in order to maintain that state which corresponds to the rest position. For example, if the user needs to hold either the first and second operating members in order to attain a certain state of a part then that state is not a rest position.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle component positioning device. Accordingly, these directional terms, as utilized to describe the bicycle component positioning device should be interpreted relative to a bicycle in an upright riding position on a horizontal surface and that is equipped with the bicycle component positioning device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component positioning device comprising:
   a wire takeup member arranged to rotate about a rotational axis in a first direction and a second direction that is opposite to the first direction;
   a positioning member configured to rotate with the wire takeup member between a plurality of predetermined positions;
   a first maintaining member configured to move between a first maintaining position to maintain the positioning member in any one of the plurality of predetermined positions and a first releasing position to release the positioning member;
   a second maintaining member configured to move between a second maintaining position to maintain the positioning member in any one of the plurality of predetermined positions and a second releasing position to release the positioning member, the first and second maintaining members being movable independently with respect to each other;
   a release member configured to move in the first direction that corresponds to a releasing direction, the first maintaining member being moved by the release member from the first maintaining position to the first releasing position as the release member moves in the first direction, and to selectively move the second maintaining member from the second maintaining position to the second releasing position, the release member being moved in the second direction as the wire takeup member rotates in the second direction from a first one of the plurality of predetermined positions to a second one of the plurality of predetermined positions; and
   a first operating member movably arranged to move the release member in the first direction from a non-release position towards a release position as the first operating member moves from a first rest position to a first actuated position, the first rest position corresponding to any one of the predetermined positions of the plurality of predetermined positions of the positioning member, the first rest position being a position in which the first operating member is at rest without receiving an external force,
   the first maintaining member movable in a first rotational direction to selectively contact the positioning member when the positioning member is in the any one of the plurality of predetermined positions to prevent rotation of the positioning member in the releasing direction while the first maintaining member is in the first maintaining position,
   the second maintaining member movable in the first rotational direction to selectively contact the positioning member when the positioning member is in the any one of the plurality of predetermined positions to prevent rotation of the positioning member in the releasing direction while the second maintaining member is in the second maintaining position.

2. The bicycle component positioning device according to claim 1, wherein
   the positioning member includes positioning teeth,
   the first maintaining member includes a first pawl that selectively engages one of the positioning teeth, and
   the second maintaining member includes a second pawl that selectively engages one of the positioning teeth.

3. The bicycle component positioning device according to claim 2, wherein
   the first pawl is biased towards the first maintaining position, and
   the second pawl is biased towards the second maintaining position.

4. The bicycle component positioning device according to claim 2, wherein
   the release member alternatively holds one of the first and second maintaining members out of engagement with the positioning teeth of the positioning member while the release member is in the release position.

5. The bicycle component positioning device according to claim 1, wherein
   the release member is movably coupled to the positioning member to move in the first direction within a prescribed range relative to the positioning member between the non-release position and the release position.

6. The bicycle component positioning device according to claim 5, further comprising
   a biasing member disposed between the release member and the positioning member, and biasing the release member to the non-release position.

7. The bicycle component positioning device according to claim 1, further comprising
   a second operating member movably arranged to rotate the positioning member and the wire takeup member in the second direction as the second operating member moves from a second rest position to a second actuated position.

8. The bicycle component positioning device according to claim 7, wherein
   the first and second operating members are configured as trigger levers that are biased towards the first and second rest positions, respectively.

9. The bicycle component positioning device according to claim 7, wherein
   the first operating member is pivotally mounted on an axis that is offset from the rotational axis of the wire takeup member, and
   the second operating member is pivotally mounted on an axis that is coaxial with the rotational axis of the wire takeup member.

10. The bicycle component positioning device according to claim 7, further comprising
    a release pawl operatively coupled to the first operating member:
    the release member includes release teeth that are engaged by the release pawl to move the release member in the first direction as the first operating member moves from the first rest position to the first actuated position.

11. The bicycle component positioning device according to claim 10, wherein
    the release pawl is biased so as to engage with the release teeth, and is held disengaged from the release teeth while the first operating member is in the first rest position.

12. The bicycle component positioning device according to claim 7, wherein
    the positioning member includes pulling teeth, and
    the second operating member is operatively coupled to a pulling pawl that engages the pulling teeth and rotates the positioning member and the wire takeup member in the second direction as the second operating member moves from the second rest position to the second actuated position.

13. The bicycle component positioning device according to claim 12, wherein
the pulling pawl is biased so as to engage the pulling teeth while the first and second operating member are in the first and second rest positions, respectively.

14. The bicycle component positioning device according to claim 13, wherein
the pulling pawl is disengaged from the pulling teeth as the first operating member moves from the first rest position toward the first actuated position.

15. The bicycle component positioning device according to claim 14, wherein
the release member includes abutments that move the pulling pawl out of engagement with the pulling teeth as the release member moves in the first direction by movement of the first operating member from the first rest position to the first actuated position.

* * * * *